(12) United States Patent
Yang et al.

(10) Patent No.: US 11,095,606 B2
(45) Date of Patent: Aug. 17, 2021

(54) DOMAIN NAME ACCESS METHOD AND DEVICE

(71) Applicant: HUAWEI TECHNOLOGIES CO., LTD., Guangdong (CN)

(72) Inventors: Jiao Yang, Xi'an (CN); Yan Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/857,751

(22) Filed: Apr. 24, 2020

(65) Prior Publication Data

US 2020/0252367 A1 Aug. 6, 2020

Related U.S. Application Data

(63) Continuation of application No. PCT/CN2018/106499, filed on Sep. 19, 2018.

(30) Foreign Application Priority Data

Oct. 27, 2017 (CN) .......................... 201711025295.8

(51) Int. Cl.
*H04L 29/12* (2006.01)
*H04L 12/841* (2013.01)

(52) U.S. Cl.
CPC ........ *H04L 61/2053* (2013.01); *H04L 47/286* (2013.01)

(58) Field of Classification Search
CPC ............ H04L 61/2053; H04L 61/6009; H04L 61/609; H04L 41/065; H04L 47/286
USPC ....................................................... 709/223
See application file for complete search history.

(56) References Cited

U.S. PATENT DOCUMENTS 7,930,427 B2 * 4/2011 Josefsberg .......... H04L 67/1002
  709/245
2010/0023611 A1 * 1/2010 Yang ................... H04L 61/1511
  709/223

(Continued)

FOREIGN PATENT DOCUMENTS

CN  101997903 A  3/2011
CN  102014173 A  4/2011

(Continued)

OTHER PUBLICATIONS

Nokia, "23 502 4 3 5 Application Function influence on traffic routing",S2-173838. May 29-Jun. 2, 2017, Hangzhou, China, total 6 pages.

(Continued)

*Primary Examiner* — Ruolei Zong
(74) *Attorney, Agent, or Firm* — Womble Bond Dickinson (US) LLP

(57) ABSTRACT

A domain name access method and a device are described. As described herein, a domain name server (DNS) server performs resolution on a domain name requested by the terminal device. The DNS server may then send an internet protocol (IP) address of an application server obtained through the resolution and use condition information to the terminal device. With this, communication efficiency of the terminal device can be improved, and waste of transmission resources in a communications system is also avoided.

15 Claims, 19 Drawing Sheets

(56) References Cited

U.S. PATENT DOCUMENTS

| | | |
|---|---|---|
| 2013/0332559 A1 | 12/2013 | Ivars et al. |
| 2014/0256286 A1* | 9/2014 | Rangarajan ............ H04W 12/00 |
| | | 455/410 |
| 2015/0358276 A1* | 12/2015 | Liu ..................... H04L 61/1511 |
| | | 726/1 |
| 2016/0050178 A1* | 2/2016 | Frydman ............. H04L 61/1552 |
| | | 709/219 |
| 2016/0212204 A1* | 7/2016 | Huang ................ H04L 61/6009 |

FOREIGN PATENT DOCUMENTS

| | | |
|---|---|---|
| CN | 104427007 A | 3/2015 |
| CN | 104754066 A | 7/2015 |
| CN | 106412148 A | 2/2017 |
| CN | 106888280 A | 6/2017 |
| WO | 2016062077 A1 | 4/2016 |
| WO | 2016108509 A1 | 7/2016 |

OTHER PUBLICATIONS

Savolainen Nokia J Kato T Lemon Nominum T et al: "Improved Recursive DNS Server Selection for Multi-Interfaced Nodes; rfc6731.txt", Dec. 19, 2012 (Dec. 19, 2012), pp. 1-29,XP015086513.

3GPP TS 23.501 V1.4.0 (Sep. 2017);3rd Generation Partnership Project;Technical Specification Group Services and System Aspects;System Architecture for the 5G System;Stage 2(Release 15);total 151 pages.

\* cited by examiner

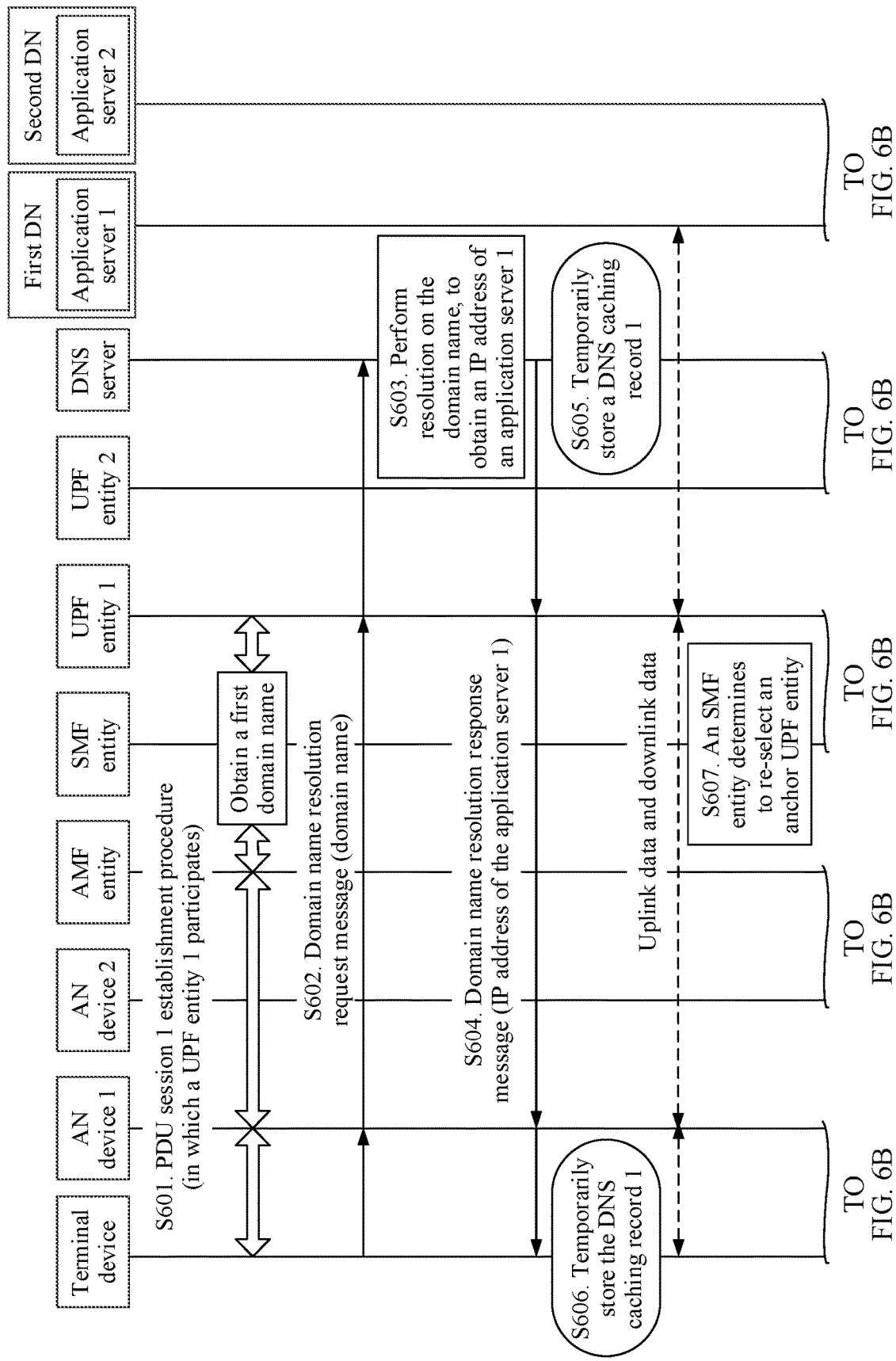

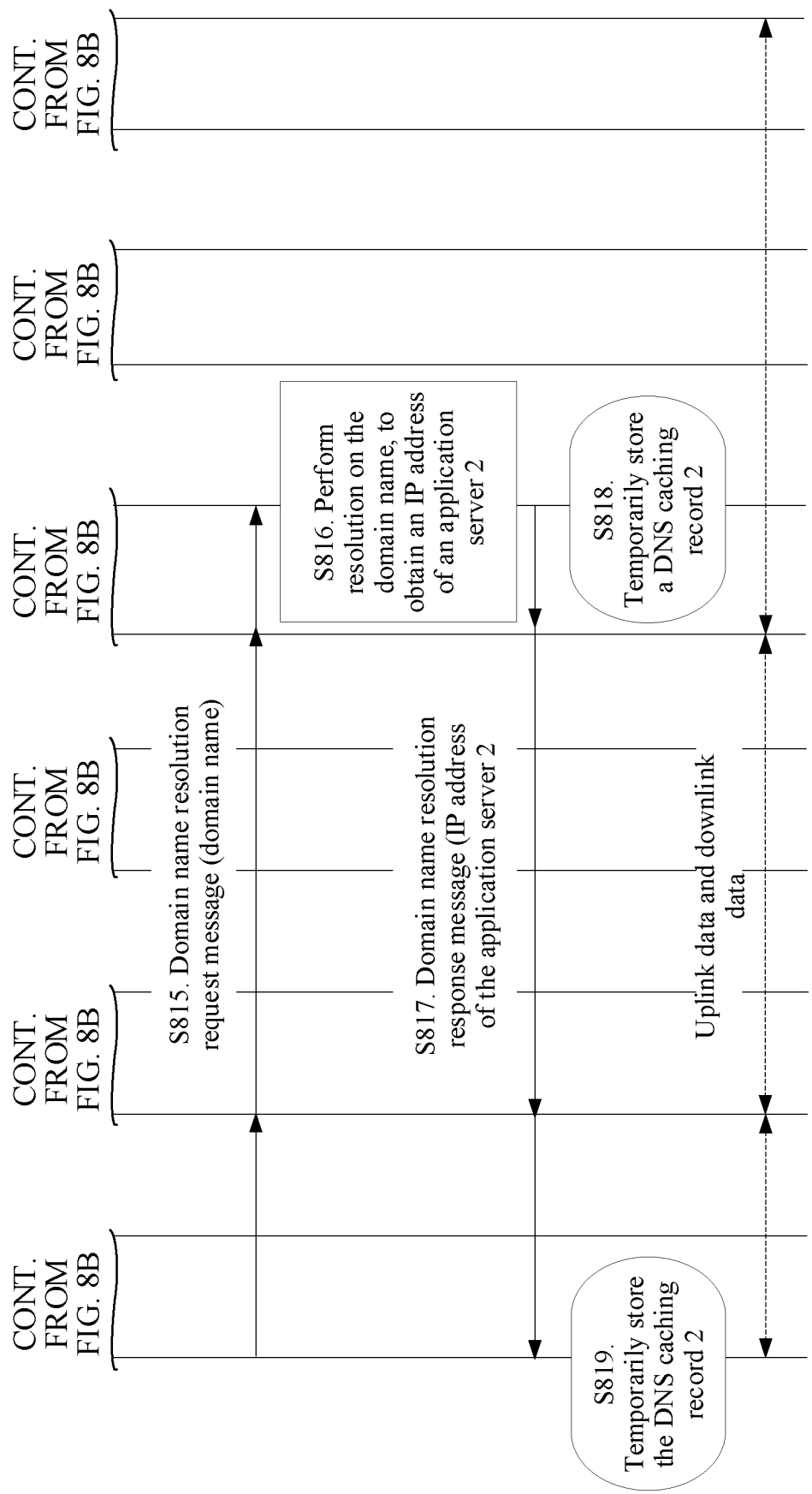

DOMAIN NAME ACCESS METHOD AND DEVICE

CROSS-REFERENCE TO RELATED APPLICATIONS

This application is a continuation of International Application No. PCT/CN2018/106499, filed on Sep. 19, 2018, which claims priority to Chinese Patent Application No. 201711025295.8, filed on Oct. 27, 2017. The disclosures of the aforementioned applications are hereby incorporated by reference in their entireties.

TECHNICAL FIELD

This application relates to the field of communications technologies, and in particular, to a domain name access method and a device.

BACKGROUND

A domain name system (DNS) is a distributed host information database, and can provide mapping and translation between a domain name and an Internet Protocol (IP) address. A terminal device may obtain an IP address of a corresponding application server through resolution on a to-be-accessed domain name by a DNS server.

Currently, a process in which the terminal device accesses a target domain name through the DNS includes the following steps. The terminal device obtains the target domain name, and then sends a domain name resolution request message carrying the target domain name to the DNS server in the DNS. After receiving the domain name resolution request message, the DNS server obtains, through resolution, an IP address of a target application server corresponding to the target domain name, adds the IP address of the target application server to a domain name resolution response message, and sends the domain name resolution response message to the terminal device. After receiving the domain name resolution response message, the terminal device obtains the IP address of the target application server, and performs data transmission with the target application server based on the IP address.

After obtaining the IP address corresponding to the domain name, the terminal device generates and temporarily stores a DNS caching record. The DNS caching record is used to represent a correspondence between the domain name and the IP address. In addition, for each temporarily stored DNS caching record, the terminal device maintains corresponding time to live (TTL). The TTL of the DNS caching record is a time period during which the DNS caching record is stored in a cache of the terminal device. In this way, if the terminal device needs to access the domain name in the DNS caching record again within the TTL of the DNS caching record, the terminal device can directly obtain, based on the DNS caching record, the IP address corresponding to the domain name. If the terminal device needs to access the domain name again after the TTL of the DNS caching record, the terminal device needs to obtain, through the foregoing process, the IP address corresponding to the domain name through the resolution by the DNS server.

However, within the time period during which the DNS caching record is stored in the terminal device, the IP address corresponding to the domain name in the DNS caching record may no longer be most suitable for the terminal device due to factors such as mobility of the terminal device and deployment of the application server. For example, the application server to which the IP address belongs is no longer the application server that is closest to the terminal device. In this case, if the terminal device still accesses the domain name by using the DNS caching record, the terminal device may access an unsuitable application server. Consequently, relatively low communication efficiency of the terminal device and waste of transmission resources in a communications system are caused.

SUMMARY

This application provides a domain name access method and a device, to improve communication efficiency of a terminal device.

According to a first aspect, an embodiment of this application provides a domain name access method. The method may include the following steps.

A DNS server receives, from a terminal device, a request message including a domain name, and then performs resolution on the domain name, to obtain an IP address of an application server corresponding to the domain name; and the DNS server then sends, to the terminal device, a response message including the IP address of the application server and use condition information, where the use condition information indicates a condition in which the terminal device accesses the domain name by using the IP address of the application server.

When information of the terminal device changes and the terminal device no longer satisfies the condition indicated by the use condition information, the application server previously obtained through the resolution may no longer be the application server that is most suitable for the terminal device. In this case, according to the method, the terminal device may obtain another suitable application server by re-performing the DNS resolution on the domain name. Therefore, in the method, communication efficiency of the terminal device can be improved, and waste of transmission resources in a communications system is also avoided.

In a possible embodiment, the use condition information includes at least one of the following: set information and location range information. The set information indicates at least one IP address of the terminal device, and the location range information indicates a location range in which the terminal device is located.

According to the embodiment, the DNS server may limit, by using the IP address of the terminal device and location information of the terminal device, the condition in which terminal device accesses the domain name by using the IP address of the application server.

In a possible embodiment, the DNS server determines the use condition information based on the received request message.

In a possible embodiment, when the request message further includes the location information of the terminal device or an IP address of the terminal device, the DNS server may determine the use condition information based on the location information of the terminal device or the IP address of the terminal device included in the request message.

According to the embodiment, the DNS server may determine the use condition information based on the current location information of the terminal device or the current IP address of the terminal device, so that it can be ensured that the application server is most suitable for the terminal device when it is determined that terminal device satisfies the condition indicated by the use condition information.

In a possible embodiment, the at least one IP address indicated by the set information includes the IP address of the terminal device; or the location range indicated by the location range information includes a location indicated by the location information of the terminal device. In this way, it can be ensured that, when accessing the domain name again when no change occurs in the IP address of the terminal device or the location of the terminal device, the terminal device can directly access the domain name by using the IP address of the application server obtained through resolution by the DNS server, and does not need to re-perform the DNS resolution on the domain name, thereby improving efficiency of accessing the domain name again by the terminal device.

In a possible embodiment, the DNS server may determine the use condition information in the following manners.

The first manner: After obtaining the location information of the terminal device or the IP address of the terminal device from the request message, the DNS server sends the location information of the terminal device or the IP address of the terminal device to a user plane function (UPF) entity, so that the UPF entity determines the use condition information based on the location information of the terminal device or the IP address of the terminal device. After determining the use condition information, the UPF entity sends the use condition information to the DNS server. In this way, the DNS server can obtain the use condition information.

The second manner: The DNS server sends the location information of the terminal device or the IP address of the terminal device to the UPF entity, so that the UPF entity determines the at least one IP address of the terminal device and/or the location range in which the terminal device is located, and notifies the DNS server of the determined at least one IP address of the terminal device and/or the determined location range in which the terminal device is located. The DNS server may determine the set information based on the learned at least one IP address of the terminal device and/or determine the location range information based on the learned location range in which the terminal device is located, thereby determining the use condition information.

The third manner: After the UPF entity receives the request message sent by the terminal device, in a process of forwarding the request message to the DNS server, the UPF entity may determine the use condition information based on the location information of the terminal device or the IP address of the terminal device in the request message, and then send the determined use condition information and the request message to the DNS server.

According to the embodiment, the DNS server may obtain the use condition information through the UPF entity.

In a possible embodiment, the DNS server sends indication information to the terminal device. The indication information is used to instruct the terminal device to perform the DNS resolution on the domain name when the terminal device does not satisfy the condition indicated by the use condition information.

According to the embodiment, after the information of the terminal device changes, the terminal device determines, based on the indication information, whether the terminal device of which the information changes satisfies the condition indicated by the use condition information, that is, determines whether the changed IP address of the terminal device is included in the at least one IP address indicated by the set information and/or whether the changed location of the terminal device is within the location range indicated by the location range information.

In a possible embodiment, the indication information may alternatively be carried in the response message. In this way, the quantity of messages transmitted by the DNS server to the terminal device can be reduced, and signaling overheads can be reduced.

In a possible embodiment, when the DNS server is a local DNS server, after obtaining the IP address of the application server and the use condition information, the DNS server may generate and store a DNS caching record. The DNS caching record includes the domain name, the use condition information, and the IP address of the application server.

When the DNS server is a root DNS server, the DNS server needs to send the response message to the terminal device through the local DNS server. In this way, when forwarding the response message, the local DNS server can generate and temporarily store the DNS caching record. The DNS caching record includes the same content as the foregoing DNS caching record.

According to the embodiment, when the terminal device sends the request message to the local DNS server again to request to resolve the domain name due to various reasons (for example, if the terminal device fails to receive the response message, or the terminal device fails to store the DNS caching record locally, the terminal device needs to request the domain name again), the local DNS server may directly determine, based on the DNS caching record temporarily stored locally, the IP address of the application server corresponding to the domain name and the use condition information, so that the IP address of the application server and the use condition information can be notified to the terminal device by using the response message, thereby improving domain name resolution efficiency of the DNS server.

According to a second aspect, an embodiment of this application further provides a domain name access method. The method may include the following steps.

A terminal device sends, to a DNS server, a request message including a domain name; then receives, from the DNS server, a response message including an IP address of an application server and use condition information; determines, after information of the terminal device changes, whether the terminal device satisfies a condition indicated by the use condition information; and performs DNS resolution on the domain name when the terminal device does not satisfy the condition indicated by the use condition information. The application server corresponds to the domain name, and the use condition information indicates a condition in which the terminal device accesses the domain name by using the IP address of the application server.

When the information of the terminal device changes and the terminal device no longer satisfies the condition indicated by the use condition information, the application server previously obtained through the resolution may no longer be the application server that is most suitable for the terminal device. In this case, according to the method, the terminal device may obtain another suitable application server by re-performing the DNS resolution on the domain name. Therefore, in the method, communication efficiency of the terminal device can be improved, and waste of transmission resources in a communications system is also avoided.

In a possible embodiment, the terminal device receives indication information from the DNS server, and determines, based on the indication information, whether the terminal device satisfies the condition indicated by the use condition information. The indication information is used to instruct the terminal device to perform the DNS resolution on the domain name when the terminal device does not satisfy the condition indicated by the use condition information.

In a possible embodiment, the use condition information includes at least one of the following: set information and location range information. The set information indicates at least one IP address of the terminal device, and the location range information indicates a location range in which the terminal device is located.

When the use condition information includes the set information, that the terminal device does not satisfy the condition indicated by the use condition information includes: an IP address of the terminal device changes and the changed IP address of the terminal device is not included in the at least one IP address indicated by the set information; and/or when the use condition information includes the location range information, that the terminal device does not satisfy the condition indicated by the use condition information includes: a location of the terminal device changes and the changed location of the terminal device is not within the location range indicated by the location range information.

When the IP address of the terminal device is one of the IP addresses indicated by the set information or the location of the terminal device is within the location range indicated by the location range information, the application server corresponding to the domain name obtained by the DNS server through the resolution may still be the most suitable application server. For example, the application server is still closest to the terminal device. In this way, the terminal device can continue to perform data transmission with the application server based on the IP address of the application server. When the changed IP address of the terminal device is not included in the IP addresses indicated by the set information or the location of the terminal device is not within the location range indicated by the location range information, the application server corresponding to the domain name obtained by the DNS server through the resolution may no longer be closest to the terminal device. To ensure communication efficiency of accessing the domain name by the terminal device, the terminal device needs to re-perform the DNS resolution on the domain name.

In a possible embodiment, after receiving the response message from the DNS server, the terminal device temporarily stores a DNS caching record. The DNS caching record includes the domain name, the use condition information, and the IP address of the application server.

According to the embodiment, the terminal device temporarily stores the DNS caching record locally, and when the terminal device further needs to access the domain name again subsequently, the terminal device may quickly obtain, based on the temporarily stored DNS caching record, the IP address of the application server through the resolution, thereby improving domain name resolution efficiency, reducing a latency of accessing the domain name, and reducing transmission of various related messages when the terminal device performs the DNS resolution.

In a possible embodiment, when the DNS caching record further includes time to live (TTL) of the DNS caching record, the terminal device determines that the terminal device does not satisfy, within the TTL, the condition indicated by the use condition information.

Because the DNS caching record is valid within the TTL, when determining that the IP address of the terminal device or the location of the terminal device changes within the TTL, the terminal device determines whether the terminal device of which the information changes satisfies the condition indicated by the use condition information. In this way, when the terminal device of which the information changes still satisfies the condition indicated by the use condition information, the terminal device can continue to perform the data transmission with the application server based on the IP address of the application server in the DNS caching record.

In a possible embodiment, the TTL is obtained by the terminal device from the response message. In this way, the quantity of messages transmitted by the local DNS server to the terminal device can be reduced, and signaling overheads can be reduced.

According to a third aspect, an embodiment of this application provides a domain name access method. The method may include the following steps.

A session management function (SMF) entity obtains, in a procedure of establishing a first session by a terminal device, a first domain name of an application server in a first data network (DN) accessed by the terminal device; obtains, in a procedure of establishing a second session by the terminal device, a second domain name of an application server in a second DN accessed by the terminal device; and sends indication information to the terminal device when the first domain name and the second domain name include a same domain name, where the indication information is used to instruct the terminal device to perform DNS resolution on the domain name.

The first DN and the second DN are different area networks. Due to mobility of the terminal device, when the terminal device moves after establishing the first session, when the second DN is closer to the terminal device than the first DN, the terminal device accesses the second DN that is closer to the terminal device, to save network resources. According to the method, when determining that the second domain name in the second DN currently accessed by the terminal device includes the same domain name as the first domain name in the first DN previously accessed by the terminal device, the SMF entity instructs the terminal device to re-perform the DNS resolution on the domain name. In this way, the terminal device can re-perform the DNS resolution on the domain name, to obtain a more suitable application server in the second DN, and then perform data transmission with the application server, to access the domain name. Therefore, in the solution, communication efficiency of the terminal device can be improved, and waste of transmission resources in a communications system is also avoided.

In a possible embodiment, the SMF entity may obtain, from a policy control function (PCF) entity or an network exposure function (NEF) entity, the first domain name of the application server in the first DN and the second domain name of the application server in the second DN.

In a possible embodiment, in a scenario in which the SMF entity cannot determine a target domain name that has been accessed by the terminal device after the terminal device accesses the first DN, that the first domain name and the second domain name include the same domain name includes any one of the following three cases.

The first case: The first domain name is the same as the second domain name (the first domain name and the second domain name have a same quantity of domain names and same domain names). For example, the first domain name includes Baidu and Sina; and the second domain name includes Baidu and Sina.

The second case: Each domain name in the first domain name is included in the second domain name (the quantity of domain names included in the second domain name is greater than the quantity of domain names included in the first domain name). For example, the first domain name includes Baidu and Sina; and the second domain name includes Baidu, Sina, and Tencent.

The third case: The first domain name and the second domain name include at least one same domain name. In other words, some domain names in the first domain name are included in the second domain name. For example, the first domain name includes Baidu and Sina; and the second domain name includes Sina and Tencent.

In the first case and the second case, the second domain name definitely includes the target domain name that has been accessed by the terminal device when the terminal device accesses the first DN. However, in the third case, the second domain name may include the target domain name. Therefore, in the first case and the second case, the SMF entity sends the indication information to the terminal device, and the terminal device communicates with the application server in the second DN, to access the target domain name. Therefore, in the method, the communication efficiency of the terminal device can be improved, and the transmission resources in the communications system can be saved. However, in the foregoing third case, the SMF entity sends the indication information to the terminal device, and the terminal device may communicate with the application server in the second DN, to access the target domain name. In the method, the communication efficiency of the terminal device may be improved.

In a possible embodiment, the indication information includes no domain name in the foregoing scenario. In this way, the indication information can instruct the terminal device to perform the DNS resolution on the domain name accessed by the terminal device after the terminal device accesses the first DN; or instruct the terminal device to perform the DNS resolution on all the domain names currently accessed by the terminal device.

In a possible embodiment, the indication information further includes the first domain name or the second domain name in the foregoing scenario. In this way, the indication information can instruct the terminal device to perform the DNS resolution on the first domain name (or the second domain name) currently accessed by the terminal device.

In a possible embodiment, in a scenario in which the SMF entity can determine the target domain name that has been accessed by the terminal device after the terminal device accesses the first DN, the first domain name and the second domain name include the same domain name, that is, both the first domain name and the second domain name include the target domain name.

Because the second domain name includes the target domain name, the SMF entity sends the indication information to the terminal device, and the terminal device communicates with the application server in the second DN, to access the target domain name. Therefore, in the method, the communication efficiency of the terminal device can be improved, and the transmission resources in the communications system can be saved.

In a possible embodiment, the indication information includes the target domain name in the foregoing design scenario. In this way, the indication information can instruct the terminal device to perform the DNS resolution on the target domain name, thereby improving pertinence of the indication information and further resolving the problem of waste of resources.

According to a fourth aspect, an embodiment of this application further provides a domain name access method. The method may include the following steps.

A network exposure function (NEF) entity determines that IP address information of an application server corresponding to a domain name changes, and then notifies a policy control function PCF entity that the IP address information of the application server corresponding to the domain name changes.

The change in the IP address information of the application server corresponding to the domain name in the NEF entity indicates adding of one application server corresponding to the domain name to a communications system. When the IP address changes due to movement of the terminal device that currently accesses the domain name, the application server closest to the terminal device may also change (which may change to an application server to which the updated DNAI corresponding to the domain name belongs). Therefore, the NEF needs to trigger a procedure of notifying the SMF entity to notify, when the IP address allocated by the SMF entity to the terminal device changes, the terminal device to re-perform the DNS resolution on the domain name. According to the method, the terminal device can obtain a more suitable application server by re-performing the resolution, and further perform data transmission with the application server, to access the domain name. Therefore, in the solution, communication efficiency of the terminal device can be improved, and waste of transmission resources in a communications system is also avoided.

In a possible embodiment, the IP address information of the application server is a data network access identifier DNAI of the application server.

In a possible embodiment, the NEF entity sends an IP address information change notification message to the PCF entity, to notify the PCF entity that the IP address information of the application server corresponding to the domain name changes.

According to a fifth aspect, an embodiment of this application further provides a domain name access method. The method may include the following steps.

A policy control function PCF entity learns, from a network exposure function (NEF) entity, that Internet Protocol (IP) address information of an application server corresponding to a domain name changes, and then sends indication information to a session management function SMF entity. The indication information is used to instruct the SMF entity to notify, when an IP address allocated by the SMF entity to the terminal device that currently accesses the domain name changes, the terminal device to perform DNS resolution on the domain name.

The change in the IP address information of the application server corresponding to the domain name in the NEF entity indicates adding of one application server corresponding to the domain name to a communications system. When the IP address changes due to movement of the terminal device that currently accesses the domain name, the application server closest to the terminal device may also change (which may change to an application server to which the updated data network access identifier (DNAI) corresponding to the domain name belongs). Therefore, the PCF entity instructs the SMF entity to notify, when the IP address allocated by the SMF entity to the terminal device changes, the terminal device to re-perform the DNS resolution on the domain name, and the terminal device can obtain a more suitable application server by re-performing the resolution, and further perform data transmission with the application server, to access the domain name. Therefore, in the solution, communication efficiency of the terminal device can be improved, and waste of transmission resources in a communications system is also avoided.

According to a sixth aspect, an embodiment of this application further provides a domain name access method. The method may include the following steps.

A session management function SMF entity receives indication information from a policy control function PCF entity; and notifies, based on the indication information when an IP address allocated by the SMF entity to a terminal device changes, the terminal device to perform DNS resolution on a domain name, where the terminal device is a terminal device that currently accesses the domain name.

The change in the IP address information of the application server corresponding to the domain name in the NEF entity indicates adding of one application server corresponding to the domain name to a communications system. When the IP address changes due to movement of the terminal device that currently accesses the domain name, the application server closest to the terminal device may also change (which may change to an application server to which the updated DNAI corresponding to the domain name belongs). Therefore, the SMF entity notifies, when the IP address allocated by the SMF entity to the terminal device changes, the terminal device to re-perform the DNS resolution on the domain name, and the terminal device can obtain a more suitable application server by re-performing the resolution, and further perform data transmission with the application server, to access the domain name. Therefore, in the solution, communication efficiency of the terminal device can be improved, and waste of transmission resources in a communications system is also avoided.

According to a seventh aspect, an embodiment of this application provides a DNS server, including a unit or means for performing the foregoing steps of the first aspect.

According to an eighth aspect, an embodiment of this application provides a terminal device, including a unit or means for performing the foregoing steps of the second aspect.

According to a ninth aspect, an embodiment of this application provides an SMF entity, including a unit or means for performing the foregoing steps of the third aspect or the sixth aspect.

According to a tenth aspect, an embodiment of this application provides an NEF entity, including a unit or means for performing the foregoing steps of the fourth aspect.

According to an eleventh aspect, an embodiment of this application provides a PCF entity, including a unit or means for performing the foregoing steps of the fifth aspect.

According to a twelfth aspect, an embodiment of this application provides a DNS server, including at least one processing element and at least one storage element. The at least one storage element is configured to store a program and data, and the at least one processing element is configured to perform the method according to the first aspect of this application.

According to a thirteenth aspect, an embodiment of this application provides a terminal device, including at least one processing element and at least one storage element. The at least one storage element is configured to store a program and data, and the at least one processing element is configured to perform the method according to the second aspect of this application.

According to a fourteenth aspect, an embodiment of this application provides an SMF entity, including at least one processing element and at least one storage element. The at least one storage element is configured to store a program and data, and the at least one processing element is configured to perform the method according to the third aspect or the sixth aspect of this application.

According to a fifteenth aspect, an embodiment of this application provides an NEF entity, including at least one processing element and at least one storage element. The at least one storage element is configured to store a program and data, and the at least one processing element is configured to perform the method according to the fourth aspect of this application.

According to a sixteenth aspect, an embodiment of this application provides a PCF entity, including at least one processing element and at least one storage element. The at least one storage element is configured to store a program and data, and the at least one processing element is configured to perform the method according to the fifth aspect of this application.

According to a seventeenth aspect, an embodiment of this application further provides a computer storage medium. The storage medium stores a software program. When read and executed by one or more processors, the software program may implement the method according to the first aspect to the sixth aspect or any embodiment of any one of the foregoing aspects.

According to an eighteenth aspect, an embodiment of this application further provides a computer program product including an instruction. When run on a computer, the computer program product enables the computer to perform the methods according to the foregoing aspects.

According to a nineteenth aspect, an embodiment of this application provides a chip system. The chip system includes a processor, configured to support any one of a terminal device, a DNS server, an SMF entity, an NEF entity, and a PCF entity in implementing a function according to the foregoing corresponding aspects. In a possible embodiment, the chip system further includes a memory. The memory is configured to store a program instruction and data that are necessary for the device. The chip system may include a chip, or may include a chip and another discrete device.

In a solution provided in embodiments of this application, a DNS server performs resolution on a domain name requested by a terminal device, and then sends, to the terminal device, use condition information and an IP address of an application server corresponding to the domain name obtained through the resolution. The use condition information indicates a condition that should be satisfied when the terminal device can access the domain name by using the IP address of the application server. In this way, the terminal device can perform, based on the received IP address of the application server, data transmission with the application server, and when information of the terminal device changes due to movement of the terminal device, and the terminal device no longer satisfies the condition indicated by the use condition information, the terminal device can re-perform DNS resolution on the domain name. When the information of the terminal device changes and the terminal device no longer satisfies the condition indicated by the use condition information, the application server previously obtained through the resolution may no longer be the application server that is most suitable for the terminal device. In this case, according to the solution, the terminal device may obtain another suitable application server by re-performing the DNS resolution on the domain name. Therefore, in the solution, communication efficiency of the terminal device can be improved, and waste of transmission resources in a communications system is also avoided.

BRIEF DESCRIPTION OF DRAWINGS

FIG. 6A and FIG. 6B are flowcharts of an example of the another domain name access method according to an embodiment of this application;

FIG. 8A, FIG. 8B, and FIG. 8C are flowcharts of an example of the still another domain name access method according to an embodiment of this application;

DESCRIPTION OF EMBODIMENTS

Figure 1:
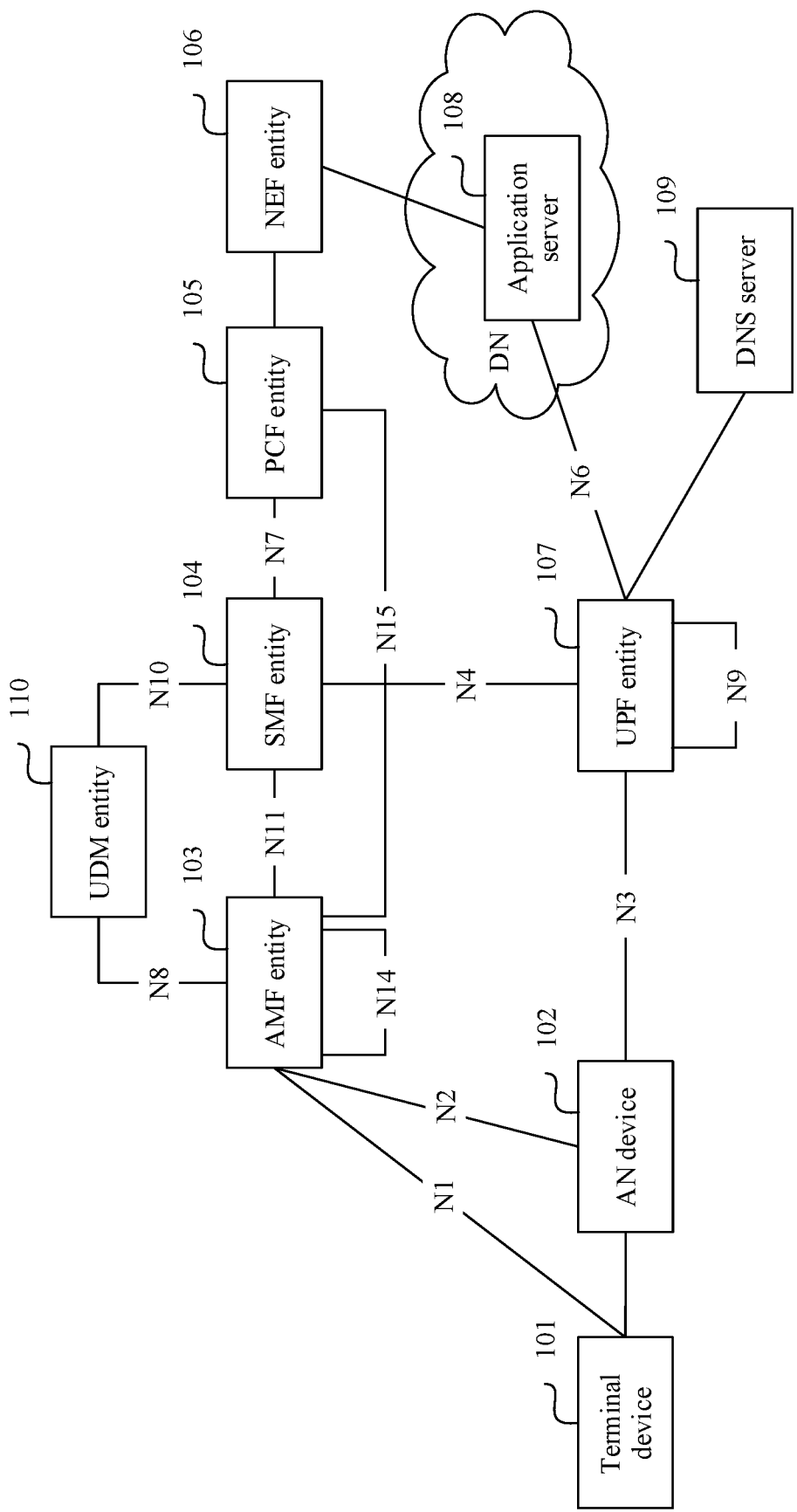
FIG. 1 is an architectural diagram of a communications system according to an embodiment of this application.

This application provides a domain name access method and a device, to improve communication efficiency of a terminal device. The method and the device are conceived based on a same invention concept. Because problem-resolving principles for the method and the device are similar, implementations of the apparatus and the method can be referenced to each other. Details of repeated parts are not described again.

In a solution provided in embodiments of this application, a DNS server performs resolution on a domain name requested by a terminal device, and then sends, to the terminal device, use condition information and an IP address of an application server corresponding to the domain name obtained through the resolution. The use condition information indicates a condition that should be satisfied when the terminal device can access the domain name by using the IP address of the application server. In this way, the terminal device can perform, based on the received IP address of the application server, data transmission with the application server, and when information of the terminal device changes due to movement of the terminal device, and the terminal device no longer satisfies the condition indicated by the use condition information, the terminal device can re-perform DNS resolution on the domain name. When the information of the terminal device changes and the terminal device no longer satisfies the condition indicated by the use condition information, the application server previously obtained through the resolution may no longer be the application server that is most suitable for the terminal device. In this case, according to the solution, the terminal device may obtain another suitable application server by re-performing the DNS resolution on the domain name. Therefore, in the solution, the communication efficiency of the terminal device can be improved, and waste of transmission resources in a communications system is also avoided.

The following describes some terms in this application, to help a person skilled in the art have a better understanding.

(1) A terminal device is also referred to as user equipment (UE), a mobile station (MS), a mobile terminal (MT), or the like, and is a device providing voice and/or data connectivity for a user. For example, the terminal device includes a handheld device or an in-vehicle device having a wireless connection function. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

(2) A DNS server is a domain name resolution device in a DNS. The DNS server may perform, by using a domain name resolution mechanism, resolution on a domain name requested by the terminal device, to obtain an IP address of an application server corresponding to the domain name.

Optionally, there may be a plurality of DNS servers distributed in the DNS in a hierarchical architecture, for example, a local DNS server and a root DNS server.

In the domain name resolution mechanism, the DNS performs the resolution on the domain name successively through the DNS servers having ascending order until the IP address of the application server corresponding to the domain name is obtained. Details of the domain name resolution mechanism are not described in the embodiments of this application again.

(3) DNS resolution means that the DNS server performs the resolution on the domain name by using the domain name resolution mechanism. The DNS resolution is proposed to distinguish from performing, by the terminal device and the DNS server, resolution on the domain name by using a DNS caching record.

(4) Use condition information of the IP address of the application server indicates a condition that the terminal device should satisfy when the terminal device can access the domain name by using the IP address of the application server. Therefore, when the terminal device satisfies the condition indicated by the use condition information, the terminal device can access the domain name by using the IP address of the application server; or when the terminal device does not satisfy the condition indicated by the use condition information, the terminal device can no longer access the domain name by using the IP address of the application server, and needs to re-perform the DNS resolution on the domain name.

Optionally, the condition may include, but is not limited to, an IP address condition and/or a location condition.

(5) Set information indicates at least one IP address of the terminal device. When the use condition information of the IP address of the application server includes the set information, the condition indicated by the use condition information is that: an IP address of the terminal device is included in the at least one IP address indicated by the set information.

The IP address may be an Internet Protocol version 4 (IPv4) address or an Internet Protocol version 6 (IPv6) prefix.

Optionally, the set information may be an IP address segment, for example, 10.10.1.85 to 10.10.1.125; or may be an IP address set, for example, 10.10.1.85, 10.10.1.86, 10.10.1.87, . . . , and 10.10.1.125. When both the DNS server and the terminal device store a plurality of IP address segments or IP address sets, the set information may alternatively be identifiers of the IP address segments or the IP address sets. A representation form of the set information is not limited in the embodiments of this application.

(6) Location range information indicates a location range of the terminal device. When the use condition information of the IP address of the application server includes the location range information, the condition indicated by the use condition information is that: a location of the terminal device is within the location range indicated by the location range information.

Optionally, the location range may be a latitude and longitude range, a range in which a specified administrative unit is located, a specified area range, or the like.

(7) A request message is also referred to as a domain name resolution request message and is sent to the DNS server when the terminal device requests the DNS server to perform the resolution on the domain name. The request message includes the domain name requested by the terminal device.

(8) A response message, also referred to as a domain name resolution response message, corresponds to the request message and is sent to the terminal device after the DNS server obtains the IP address of the application server corresponding to the domain name through the resolution. The response message includes the IP address of the application server.

In the embodiments of this application, the response message includes the IP address of the application server, and further includes the use condition information of the IP address of the application server. In this way, when the terminal device does not satisfy the condition indicated by the use condition information, the terminal device can no longer access the domain name by using the IP address of the application server, and needs to re-perform the DNS resolution on the domain name.

(9) The DNS caching record is stored in a cache of the DNS server or the terminal device and is used to record a result of the resolution performed by the DNS server on the domain name.

Optionally, the DNS caching record may include the domain name and the IP address of the application server corresponding to the domain name.

Optionally, during a process of resolving the domain name, if the DNS server further obtains the use condition information of the IP address of the application server obtained through the resolution, the DNS caching record includes the domain name, the use condition information, and the IP address of the application server corresponding to the domain name.

In addition, optionally, the DNS caching record further includes TTL of the DNS caching record. That is, the TTL starts when the DNS caching record is successfully stored in the cache, and the DNS caching record is valid within the TTL and becomes invalid after the TTL.

(10) The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

It should be noted that, in this application, "plurality of" means two or more than two.

In addition, it should be understood that, in descriptions of this application, terms such as "first" and "second" are merely used for purposes of distinguishing descriptions and are neither intended to indicate or imply relative importance nor intended to indicate or imply a sequence.

The following specifically describes the embodiments of this application in detail with reference to accompanying drawings.

FIG. 1 shows a possible architecture of a communications system to which a domain name access method provided in the embodiments of this application is applied. Referring to FIG. 1, the communications system includes: a terminal device 101, an access network (AN) device 102, a plurality of network element devices in a core network, a DNS server 109 in a DNS, and a data network (DN).

As shown in the figure, network element devices in the core network include: control plane function (CPF) entities such as an access and mobility management function (AMF) entity 103, a session management function (SMF) entity 104, a policy control function (PCF) entity 105, and a network exposure function (NEF) entity 106, a user plane function (UPF) entity 107, and a unified data management (UDM) entity 110.

The DN may be the Internet, an IP multi-media service (IMS) network, an area network (that is, a local network, for example, a mobile edge computing MEC) network), or the like.

The DN includes an application server 108. The application server 108 provides a business service for the terminal device 101 by performing data transmission with the terminal device 101.

The AN device 102 is a device that connects the terminal device 101 to a wireless network in the communications system. The AN device is a node in a radio access network, and may also be referred to as a base station, or may be referred to as a radio access network (RAN) node (or device). Currently, some examples of the AN device are a next generation Node B (gNB), a transmission reception point (TRP), an evolved Node B (eNB), a radio network controller (RNC), a node B (NB), a base station controller (BSC), a base transceiver station (BTS), a home base station (for example, a home evolved NodeB or a home Node B, HNB), a baseband unit (BBU), a wireless fidelity (Wifi) access point (AP), and the like.

The core network is configured to connect the terminal device 101 to the application server 108 in a DN that can implement a service of the terminal device 101. The following describes functions of the network element devices in the core network.

The AMF entity 103 may be configured to be responsible for procedures such as registration, mobility management, and tracking area update of the terminal device 101.

The SMF entity 104 may be configured to be responsible for session management (including session establishment, session modification, and session release) of the terminal device 101, selection and reselection of the UPF entity 107, IP address allocation and quality of service (QoS) control of the terminal device 101, and the like.

The PCF entity 105 may be configured to be responsible for functions such as a policy control decision function.

The NEF entity 106 may be responsible for transferring information between the application server 108 and a network function entity (for example, the SMF entity 104, the application server 108, or the PCF entity 105), and storing the information obtained from the application server 108 or the network function entity, for example, storing a correspondence between a domain name and IP address information of the application server.

The UDM entity 110 may be configured to manage subscription data of the terminal device 101 and registration information related to the terminal device 101.

The UPF entity 107 may be configured to forward user plane data of the terminal device 101.

The foregoing entities in the core network may be network elements implemented on dedicated hardware, or may be software examples run on dedicated hardware, or examples of a virtualization function on an appropriate platform. For example, the foregoing virtualization platform may be a cloud platform.

In addition, in the communications system, the terminal device 101, the AN device, the network element devices in the core network, the application server 108 in the DN, and the DNS server 109 are connected by using corresponding interfaces, as shown in FIG. 1. Details are not described herein again.

It should be noted that the communications system shown in FIG. 1 does not constitute a limitation to a communications system to which the embodiments of this application can be applied. Therefore, the method provided in the embodiments of this application may also be applied to a 2nd generation (2G) mobile communications system, for example, a Global System of Mobile Communications (GSM) and a General Packet Radio Service (GPRS) system; or may be applied to a 3rd generation (3G) mobile communications system, for example, a Universal Mobile Telecommunications System (UMTS); or may be applied to a 4th generation (4G) mobile communications system; and may be applied to various 5th generation (5G) mobile communications networks or various future communications networks.

Figure 2A:
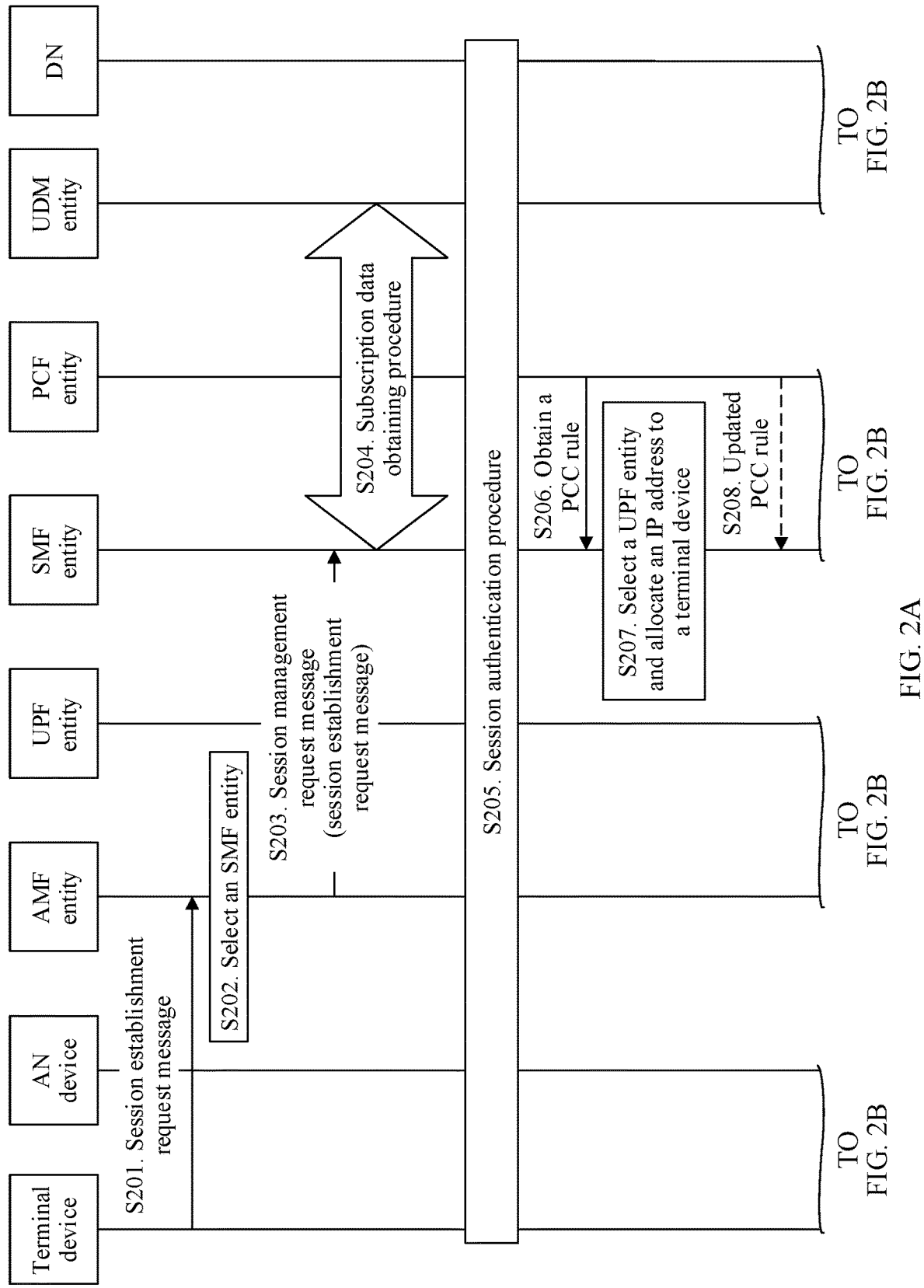
FIG. 2A and FIG. 2B are flowcharts of establishing a session according to an embodiment of this application.
Figure 2B:
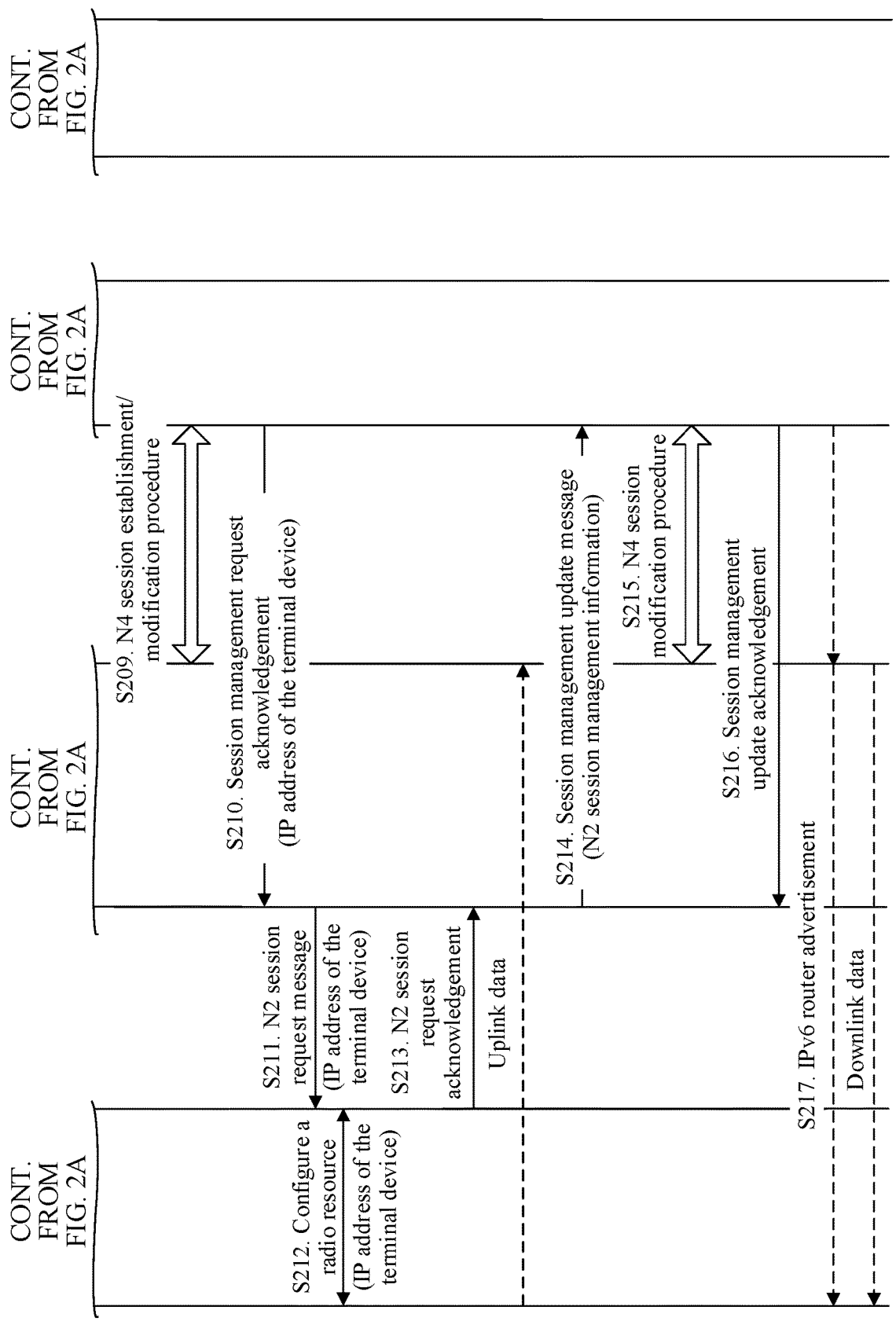

In the communications system shown in FIG. 1, the terminal device may perform session establishment (the following is described by using packet data unit (PDU) session establishment as an example) by using a procedure shown in FIG. 2A and FIG. 2B, to perform data transmission with the application server in the DN, thereby implementing a service of the terminal device. Referring to FIG. 2A and FIG. 2B, a session establishment procedure of the terminal device includes the following steps.

S201: The terminal device sends a session establishment request message to an AMF entity, where the session establishment request message includes a PDU session identifier (ID).

Optionally, the session establishment request message may be included in a non-access stratum (NAS) message. The session establishment request message may further include at least one of the following: single-network slice selection assistance information (S-NSSAI), an identifier (DN number, DNN) of a DN that the terminal device requests to access, and N1 session management (SM) information. The S-NSSAI is used for network slice selection.

S202: The AMF entity selects a suitable SMF entity for the terminal device.

S203: The AMF entity sends a session management request message (SM Request) to the selected SMF entity, where the session management request message includes the session establishment request message.

Optionally, the session management request message further includes at least one of the following: an identifier (for example, a subscriber permanent identifier (SUPI) or a subscriber temporary identifier) of the terminal device, the S-NSSAI, the PDU session ID, the DNN, an ID of the AMF entity, the N1 SM information, location information (user location information) of the terminal device, and an access technology type.

S204: The SMF entity obtains subscription data of the terminal device from a UDM entity during a subscription data obtaining procedure.

The subscription data includes at least one of the following: (an) authorized PDU type(s) (type(s)), (an) authorized session and service continuity (SSC) mode(s), and a quality of service (QoS) file/description.

The subscription data obtaining procedure includes the following steps.

The subscription data obtaining procedure includes:

a. sending, by the SMF entity, a subscription data request message to the UDM entity; and b. returning, by the UDM entity to the SMF entity, a subscription data response message carrying the subscription data.

S205: The communications system performs a PDU session authentication procedure.

S206: The SMF selects a PCF entity for the terminal device, and obtains a policy and charging control (PCC) rule from the PCF entity.

S207: The SMF entity selects, based on information such as the location information and the subscription data of the terminal device and the SSC mode(s), a suitable UPF entity for the terminal device, and allocates, based on the PDU session, an IP address to the terminal device.

Optionally, the IP address may be an IPv4 address or an IPv6 prefix.

S208: When the PCC rule obtained by the SMF entity in S206 is a dynamic PCC rule, the SMF entity obtains an updated PCC rule from the PCF entity.

It should be noted that if the PCC rule obtained by the SMF entity in S206 is not the dynamic PCC rule, the SMF entity may not perform S208. Therefore, S208 is an optional step.

S209: If the communications system does not perform S205, the SMF entity initiates an N4 session establishment procedure to the selected UPF entity; or if the communications system performs S205, the SMF entity initiates an N4 session modification procedure to the UPF.

By initiating the N4 session establishment/modification procedure, the SMF entity may provide packet detection, enforcement and reporting rules for the UPF entity. If the SMF entity allocates core network (CN) tunnel information, the SMF entity also sends the CN tunnel information to the UPF entity.

S210: The SMF entity sends a session management request acknowledgement (SM Request ACK) to the AMF entity.

The session management request acknowledgement may further include:

N2 session management information (SM information), for example, the PDU session ID, QoS configuration (profile), or the CN tunnel information; and the N1 session management information, for example, a PDU session establishment accept message (including a QoS rule or the SSC mode(s)).

S211: The AMF entity sends an N2 session request message to an AN device, where the N2 session request message includes the N2 session management information and the PDU session establishment accept message.

S212: The AN device performs signaling interworking with the terminal device, to configure a radio resource. By performing the procedure, the AN device sends the PDU session establishment accept message obtained from the SMF entity to the terminal device.

S213: The AN device sends an N2 session request acknowledgement (N2 PDU session request ACK) to the AMF entity, where the N2 session request acknowledgement includes an N2 message, and the N2 message may include AN tunnel information.

After S213, the terminal device may send uplink data to the UPF entity, as shown in the figure.

S214: The AMF entity sends a session management update message (SM update) to the SMF entity.

The session management update message further includes the N2 session management information (N2 SM information).

S215: The SMF entity initiates the N4 session modification procedure to the UPF, and sends the AN tunnel information and the CN tunnel information to the UPF entity in the procedure.

S216: The SMF entity sends a session management update acknowledgement (SM update ACK) to the AMF entity.

Optionally, in the foregoing procedure, when the IP address allocated by the SMF entity to the terminal device is the IPv4 address, the SMF entity may send the IP address of the terminal device to the terminal device through S210, S211, and S212, that is, the IP address of the terminal device is carried in the message transmitted in the foregoing steps, as shown in the figure.

S217: When a PDU type is IPv6, the IP address allocated by the SMF entity to the terminal device is the IPv6 prefix, and the SMF entity sends an IPv6 router advertisement message to the terminal device through the UPF entity, where the IPv6 router advertisement message includes the IPv6 prefix of the terminal device.

In this case, the message transmitted in the foregoing S210, S211, and S212 carries no IP address of the terminal device.

After S216 or S217, the terminal device may receive downlink data sent by the UPF entity, as shown in the figure.

Through the foregoing procedure, the terminal device may establish the PDU session, thereby implementing a service of the terminal device.

After establishing the PDU session, when the terminal device needs to access a target domain name, the terminal device may send a domain name resolution request message to the DNS server through the UPF entity. After the DNS server obtains an IP address of an application server corresponding to the target domain name through resolution, a domain name resolution response message including the IP address of the application server may alternatively be returned to the terminal device through the UPF entity. In this way, the terminal device can perform, based on the IP address of the application server, data transmission with the application server, thereby accessing the target domain name.

Figure 3:
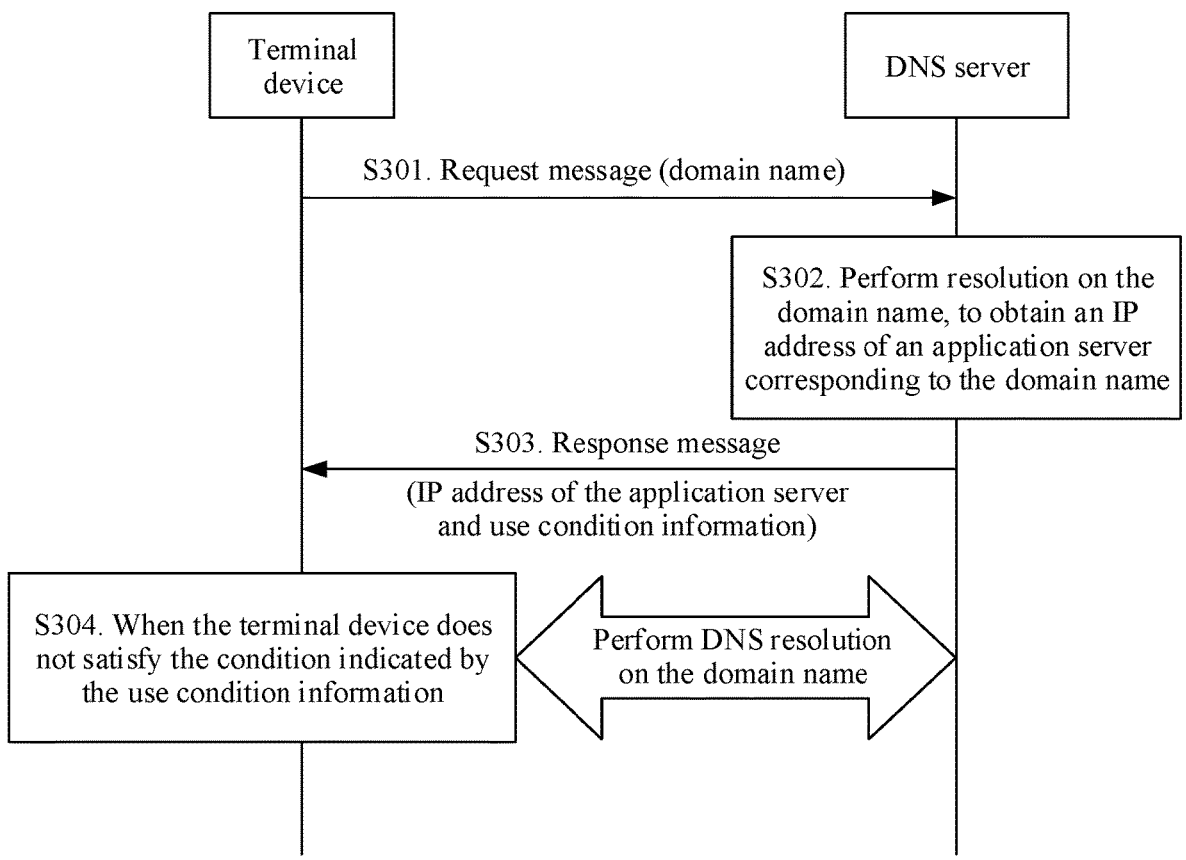
FIG. 3 is a flowchart of a domain name access method according to an embodiment of this application.

An embodiment of this application provides a domain name access method, applied to the communications system shown in FIG. 1. Referring to FIG. 3, a procedure of the method includes the following steps.

S301: A terminal device sends a request message to a DNS server, where the request message includes a domain name requested by the terminal device.

Optionally, the request message further includes location information of the terminal device or an IP address of the terminal device. The location information of the terminal device may be location information of an AN device currently accessed by the terminal device.

In this embodiment of this application, before accessing the domain name, the terminal device needs to successfully establish a session. In this way, in a domain name resolution procedure, the terminal device can perform communications interaction with the DNS server through a UPF entity serving the terminal device in the communications system, that is, the terminal device can send the request message to the DNS server through the UPF entity. Correspondingly, the DNS server may alternatively send a response message to the terminal device subsequently through the UPF entity.

S302: After receiving the request message from the terminal device, the DNS server performs resolution on the domain name, to obtain an IP address of an application server corresponding to the domain name.

The DNS server may perform the resolution on the domain name by using a DNS domain name resolution mechanism. For example, the DNS server selects an application server closest to the terminal device. Details of the specific process are not described in the embodiments of this application again.

S303: The DNS server sends the response message to the terminal device, where the response message includes the IP address of the application server and use condition information, and the use condition information indicates a condition in which the terminal device accesses the domain name by using the IP address of the application server.

Optionally, the use condition information may include at least one of the following: set information and location range information.

The set information indicates at least one IP address of the terminal device. The location range information indicates a location range in which the terminal device is located.

Before performing S303, the DNS server further needs to determine the use condition information. Optionally, the DNS server may obtain the use condition information based on the request message.

Optionally, when the request message further includes the location information of the terminal device or the IP address of the terminal device, the DNS server obtains the use condition information based on the location information of the terminal device or the IP address of the terminal device included in the request message.

The at least one IP address indicated by the set information included in the use condition information includes the IP address of the terminal device; or the location range indicated by the location range information included in the use condition information includes a location indicated by the location information of the terminal device.

In the communications system, the UPF entity stores an address pool, and allocates, based on the location information of the terminal devices, IP addresses in the address pool to corresponding terminal devices. Therefore, in this embodiment of this application, the DNS server may obtain the use condition information through the UPF entity. The following cases are specifically included.

The first case: After obtaining the location information of the terminal device or the IP address of the terminal device from the request message, the DNS server sends the location information of the terminal device or the IP address of the terminal device to the UPF entity, so that the UPF entity determines the use condition information based on the location information of the terminal device or the IP address of the terminal device. After determining the use condition information, the UPF entity sends the use condition information to the DNS server. In this way, the DNS server can obtain the use condition information.

Optionally, in the first possible embodiment of the first case, the UPF entity may determine the set information based on the location information of the terminal device by performing the following steps.

The UPF entity screens, from the stored location information of a plurality of terminal devices, location information of a plurality of target terminal devices (which may include the terminal device) within a same area range as the location information of the terminal device. The area range may be a preset area range (for example, an administrative unit such as a district, a county, or a city), or an area range in which the distance is set by using the location information of the terminal device as a center. This is not limited in this application.

The UPF entity determines, based on the screened location information of the plurality of target terminal devices, IP addresses allocated to the plurality of target terminal devices; and determines the set information based on the IP addresses of the plurality of target terminal devices. Optionally, the IP addresses indicated by the set information may be the IP addresses of the plurality of target terminal devices, or include at least the IP addresses of the plurality of target terminal devices.

For example, the IP addresses of the three target terminal devices are 10.10.1.85, 10.10.1.87, and 10.10.1.93, and the IP addresses indicated by the set information may be 10.10.1.85, 10.10.1.87, and 10.10.1.93, or the IP addresses indicated by the set information are 10.10.1.85 to 10.10.1.93.

Optionally, in the second possible embodiment of the first case, the UPF entity may alternatively determine the set information based on the IP address of the terminal device by performing the following steps.

The UPF entity may divide, based on the area range in which the stored location information of each terminal device is located, the stored location information of the plurality of terminal devices, to generate a plurality of location information sets; and the UPF entity then groups the IP addresses of the terminal devices corresponding to the location information of the terminal devices included in each location information set into a corresponding IP address set.

The UPF entity determines the IP address set to which the IP address of the terminal device belongs, and generates the set information based on the IP address set. The IP addresses indicated by the set information may be the IP addresses in the IP address set, or include at least the IP addresses in the IP address set.

Optionally, in the third possible embodiment of the first case, the UPF entity may alternatively determine the location range information based on the location information of the terminal device by performing the following steps.

The UPF entity determines, from a plurality of preset location ranges (for example, an area range in which an administrative unit such as a district, a county, or a city is located), a target location range to which a location indicated by the location information of the terminal device belongs, and then determines the location range information based on the target location range; or the UPF entity determines a location indicated by the location information of the terminal device, and then determines that an area range in which the distance is set by using a location of the terminal device as a center is a target location range, and then determines the location range information based on the target location range.

Optionally, in the fourth possible embodiment of the first case, the UPF entity may alternatively determine the location range information based on the IP address of the terminal device by performing the following steps.

The UPF entity may divide, based on the area range in which the stored location information of each terminal device is located, the stored location information of the plurality of terminal devices, to generate a plurality of location information sets; and the UPF entity then groups the IP addresses of the terminal devices corresponding to the location information of the terminal devices included in each location information set into a corresponding IP address set.

The UPF entity determines the IP address set to which the IP address of the terminal device belongs, and determines that an area range to which the location information set corresponding to the IP address set belongs is a target location range; and may finally determine the location range information based on the target location range.

The second case: The DNS server sends the location information of the terminal device or the IP address of the terminal device to the UPF entity, so that the UPF entity determines at least one IP address of the terminal device and/or the location range in which the terminal device is located, and notifies the DNS server of the determined at least one IP address of the terminal device and/or the determined location range in which the terminal device is located. In this way, the DNS server can determine the set information based on the learned at least one IP address of the terminal device and/or determine the location range information based on the learned location range in which the terminal device is located, thereby determining the use condition information.

Optionally, in the first possible embodiment of the second case, for a specific process in which the UPF entity determines the at least one IP address of the terminal device based on the location information of the terminal device, refer to the description of determining the IP addresses of the plurality of target terminal devices in the first possible embodiment of the first case. Details are not described herein again.

Optionally, in the second possible embodiment of the second case, for a specific process in which the UPF entity determines, based on the IP address of the terminal device, the at least one IP address of the terminal device, refer to the description of determining the IP address set to which the IP address of the terminal device belongs in the second possible embodiment of the first case. Details are not described herein again.

Optionally, in the third possible embodiment of the second case, for a specific process in which the UPF entity determines, based on the location information of the terminal device, the location range in which the terminal device is located, refer to the description of determining the target location range in the third possible embodiment of the first case. Details are not described herein again.

Optionally, in the fourth possible embodiment of the second case, for a specific process in which the UPF entity determines, based on the IP address of the terminal device, the location range in which the terminal device is located, refer to the description of determining the target location range in the fourth possible embodiment of the first case. Details are not described herein again.

The third case: After the UPF entity receives the request message sent by the terminal device in S301, in a process of forwarding the request message to the DNS server, the UPF entity may determine the use condition information based on the location information of the terminal device or the IP address of the terminal device in the request message, and then send the determined use condition information and the request message to the DNS server. Optionally, the UPF entity may alternatively send the determined use condition information to the DNS server by using the request message. In other words, the request message sent to the DNS server may include the determined use condition information. After obtaining the use condition information and obtaining the IP address of the application server through resolution, the DNS server sends the response message to the terminal device.

Optionally, in the foregoing third case, for a specific process in which the UPF entity determines the use condition information based on the location information of the terminal device or the IP address of the terminal device, refer to the descriptions in the first possible embodiment to the fourth possible embodiment of the first case. Details are not described herein again.

In a possible embodiment, the DNS server sends the use condition information to the terminal device by performing S303, and then the terminal device determines, when the IP address of the terminal device or the location of the terminal device changes, whether the changed terminal device satisfies the condition indicated by the use condition information.

In another possible embodiment, the DNS server notifies the terminal device of a processing manner of the use condition information, that is, the DNS server sends indication information to the terminal device, where the indication information is used to instruct the terminal device to perform DNS resolution on the domain name when the terminal device does not satisfy the condition indicated by the use condition information. In this way, before information of the terminal device (the IP address of the terminal device and/or the location of the terminal device) changes, the terminal device receives the indication information from the DNS server. After the information of the terminal device changes, the terminal device determines, based on the indication information, whether the terminal device of which the information changes satisfies the condition indicated by the use condition information, that is, determines whether the changed IP address of the terminal device is included in the at least one IP address indicated by the set information and/or whether the changed location of the terminal device is within the location range indicated by the location range information.

Optionally, the indication information may also be carried in the response message. In this way, the quantity of messages transmitted by the DNS server to the terminal device can be reduced, and signaling overheads can be reduced.

In addition, when the DNS server is a local DNS server, after obtaining the IP address of the application server and the use condition information, the DNS server may further generate a DNS caching record, and temporarily store the DNS caching record. The DNS caching record includes the domain name, the use condition information, and the IP address of the application server.

When the DNS server is a root DNS server, the DNS server needs to send the response message to the terminal device through the local DNS server. When forwarding the response message, the local DNS server may generate and temporarily store the DNS caching record.

In this way, when the terminal device sends the request message to the local DNS server again to request to resolve the domain name due to various reasons (for example, if the terminal device fails to receive the response message, or the terminal device fails to store the DNS caching record locally, the terminal device needs to request the domain name again), the local DNS server can directly determine, based on the DNS caching record temporarily stored locally, the IP address of the application server corresponding to the domain name and the use condition information, so that the IP address of the application server and the use condition information can be notified to the terminal device by using the response message, thereby improving domain name resolution efficiency of the DNS server.

Optionally, the DNS caching record generated by the local DNS server further includes TTL of the DNS caching record.

Optionally, the local DNS server may add the TTL to the response message, or send the TTL to the terminal device by using another independent message, so that the DNS caching record generated by the terminal device further includes the TTL. In this way, the local DNS server and the terminal device can maintain the DNS caching records of the local DNS server and the terminal device in a synchronous manner.

S304: After receiving the response message from the DNS server, the terminal device performs the DNS resolution on the domain name when the terminal device does not satisfy the condition indicated by the use condition information.

After receiving the response message from the DNS server, the terminal device can perform data transmission with the application server by using the IP address of the application server in the response message.

Due to mobility of the terminal device, when the terminal device is in a mobile state, the AN device accessed by the terminal device and the UPF entity serving the terminal device may change, and the SMF entity in the communications system may also re-select another UPF entity for the terminal device based on real-time location information of the terminal device or a load status of the UPF entity currently serving the terminal device. In this way, the terminal device needs to establish a new session for the re-selected UPF entity. In a process of establishing the new session, the SMF entity may allocate a new IP address to the terminal device. The new IP address is different from the previously allocated IP address.

In addition, it may be learned from the foregoing description of the method for obtaining the use condition information that, when the changed IP address of the terminal device is one of the IP addresses indicated by the set information, the location of the terminal device is still within the area range corresponding to the set information. Therefore, the application server corresponding to the domain name obtained by the DNS server through the resolution in S302 may still be the most suitable application server. For example, the application server is still closest to the terminal device. In this way, the terminal device can continue to perform the data transmission with the application server based on the IP address of the application server. When the changed IP address of the terminal device is not included in the IP addresses indicated by the set information, for example, the application server corresponding to the domain name obtained by the DNS server through the resolution in S302 may no longer be closest to the terminal device. To ensure communication efficiency of accessing the domain name by the terminal device, the terminal device needs to re-perform the DNS resolution on the domain name.

Optionally, after receiving the response message from the DNS server, the terminal device may generate a DNS caching record, and temporarily store the DNS caching record. The DNS caching record includes the domain name, the use condition information, and the IP address of the application server.

According to the method, the terminal device temporarily stores the DNS caching record locally, and when the terminal device further needs to access the domain name again subsequently, the terminal device may quickly obtain, based on the temporarily stored DNS caching record, the IP address of the application server through the resolution, thereby improving the domain name resolution efficiency, reducing a latency of accessing the domain name, and reducing transmission of various related messages when the terminal device performs the DNS resolution.

Optionally, the DNS caching record generated by the terminal device further includes time to live TTL of the DNS caching record. The TTL may be obtained by the terminal device from the response message.

Because the DNS caching record is valid within the TTL, in the process in which the terminal device performs S304, when determining that the IP address of the terminal device or the location of the terminal device changes within the TTL, the terminal device determines whether the terminal device of which the information changes satisfies the condition indicated by the use condition information. In this way, when the terminal device of which the information changes still satisfies the condition indicated by the use condition information, the terminal device can continue to perform the data transmission with the application server based on the IP address of the application server in the DNS caching record.

According to the method provided in this embodiment of this application, the DNS server performs the resolution on the domain name requested by the terminal device, and then sends, to the terminal device, the IP address of the application server corresponding to the domain name obtained through the resolution and the use condition information indicating the condition that should be satisfied when the terminal device can access the domain name by using the IP address of the application server. In this way, the terminal device can perform, based on the received IP address of the application server, the data transmission with the application server, and when the information of the terminal device changes due to movement of the terminal device and the terminal device no longer satisfies the condition indicated by the use condition information, the terminal device can re-perform the DNS resolution on the domain name. When the information of the terminal device changes and the terminal device no longer satisfies the condition indicated by the use condition information, the application server previously obtained through the resolution may no longer be the application server that is most suitable for the terminal device. In this case, according to the solution, the terminal device can obtain another suitable application server by re-performing the DNS resolution on the domain name. Therefore, in the solution, the communication efficiency of the terminal device can be improved, and waste of transmission resources in a communications system is also avoided.

Figure 4A:
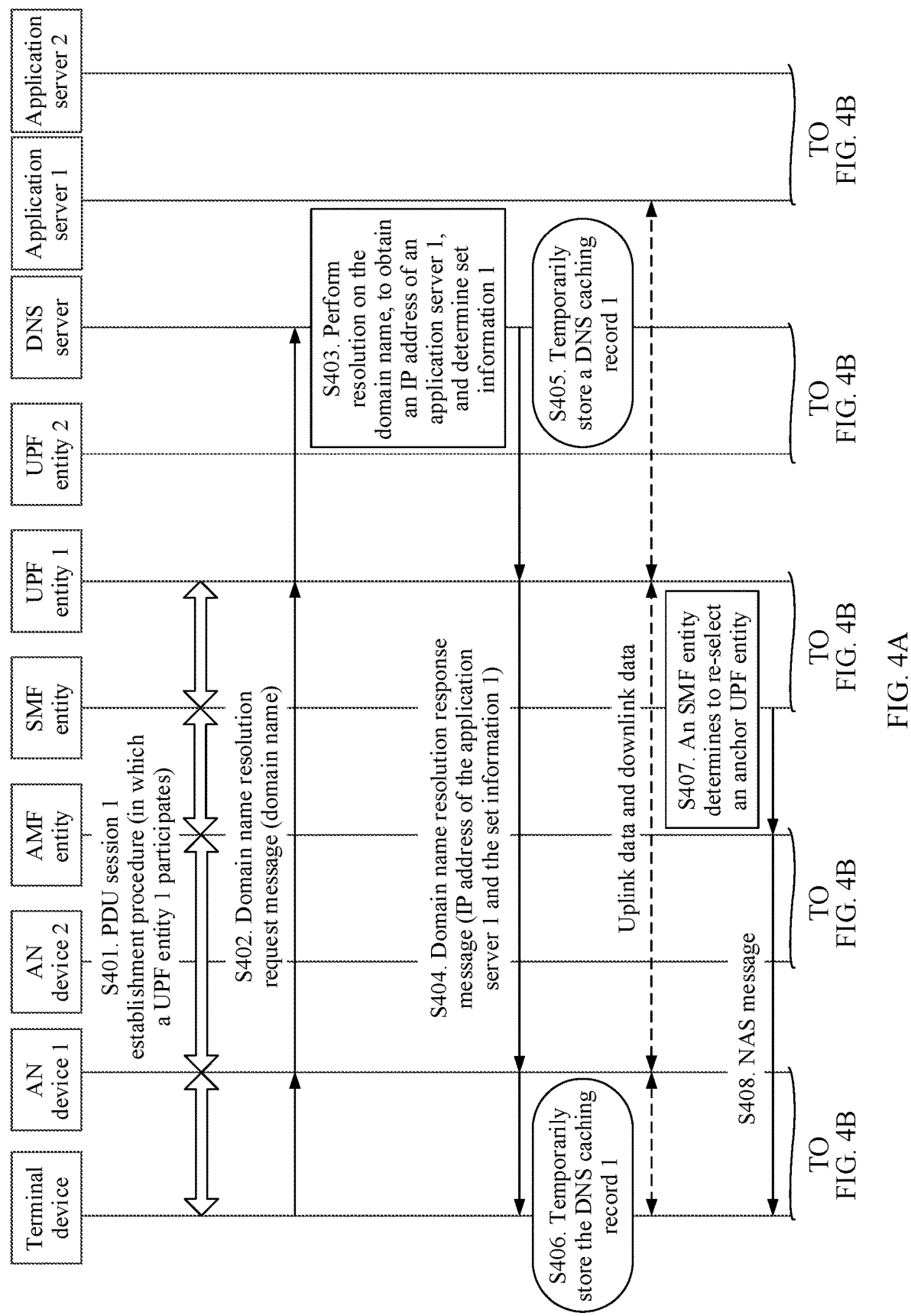
FIG. 4A and FIG. 4B are flowcharts of an example of the domain name access method according to an embodiment of this application.
Figure 4B:
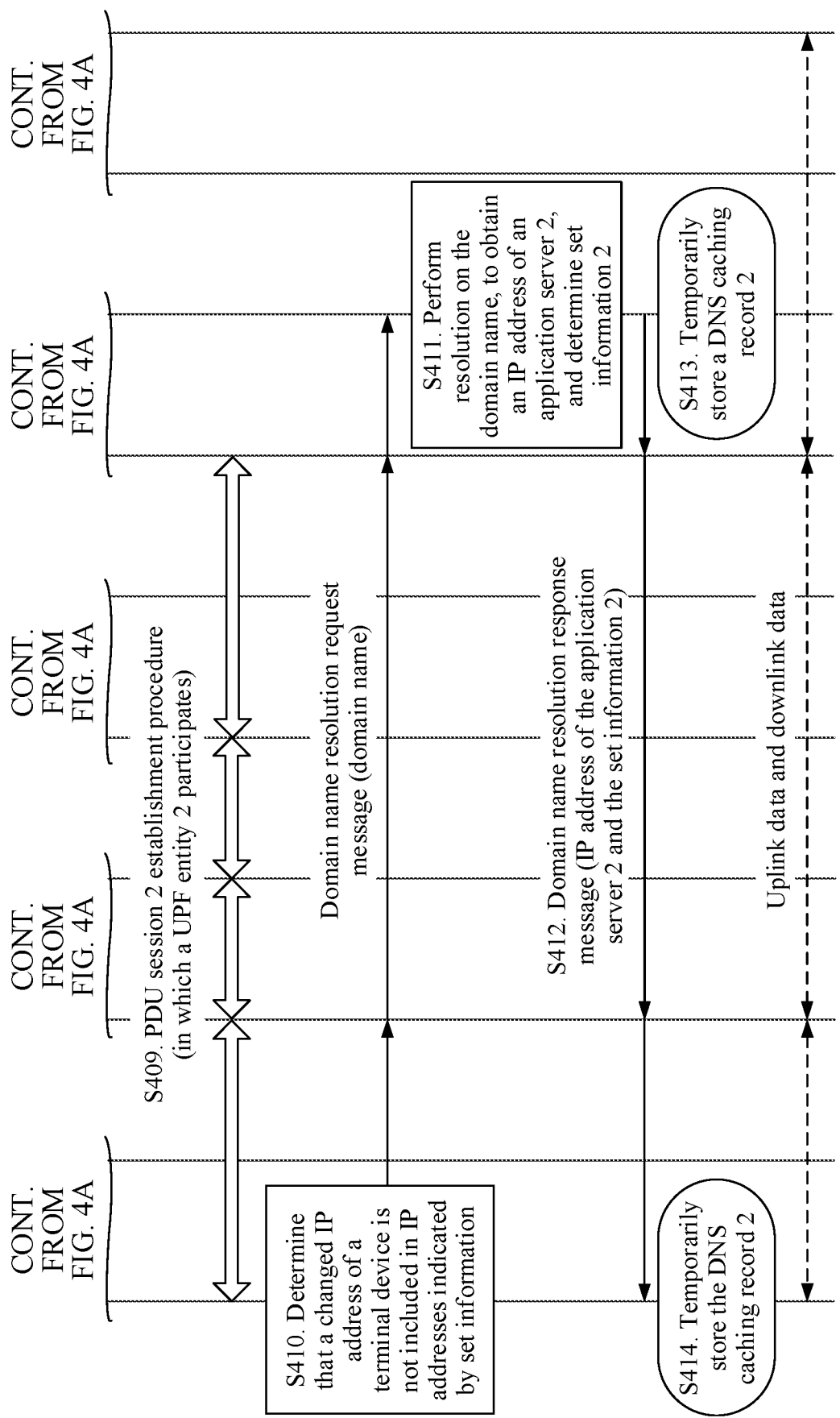

Based on the domain name access method provided in the embodiment shown in FIG. 3, an embodiment of this application further provides an example of the domain name access method. The example is applied to the communications system shown in FIG. 1. Referring to FIG. 4A and FIG. 4B, a procedure of the example includes the following steps.

S401: A terminal device establishes a PDU session 1 through network element devices (an AMF entity, an SMF entity, and a UPF entity 1) in a core network and an AN device 1. In a PDU session 1 establishment procedure, an anchor UPF entity selected by the SMF entity is the UPF entity 1. Therefore, the UPF entity 1 participates in the PDU session 1 establishment procedure.

In the PDU session 1 establishment procedure, the SMF entity allocates an IP address 1 to the terminal device.

S402: After establishing the PDU session 1 successfully, the terminal device sends, through the AN device 1 and the UPF entity 1 when the terminal device needs to access a domain name, a domain name resolution request message carrying the domain name to a DNS server.

The domain name resolution request message carries location information 1 of the terminal device or an IP address 1 of the terminal device.

S403: The DNS server performs resolution on the domain name, to obtain an IP address of an application server 1 corresponding to the domain name, and determines set information 1 based on the location information 1 of the terminal device or the IP address 1 of the terminal device carried in the domain name resolution request message.

The set information 1 indicates at least one IP address of the terminal device.

For a manner in which the DNS server determines the set information 1 based on the location information 1 of the terminal device or the IP address 1 of the terminal device, refer to the description of S303 in FIG. 3. Details are not described herein again.

S404: The DNS server sends a domain name resolution response message to the terminal device through the UPF entity 1 and the AN device 1. The domain name resolution response message includes the IP address of the application server 1 and the set information 1.

S405: The DNS server generates and temporarily stores a DNS caching record 1. The DNS caching record 1 includes the domain name, the set information 1, and the IP address of the application server 1.

S406: After receiving the domain name resolution response message, the terminal device generates and temporarily stores the DNS caching record 1.

The DNS caching record 1 generated by the terminal device includes same content as the DNS caching record 1 generated by the DNS server.

Optionally, the DNS caching record 1 may further include TTL of the DNS caching record 1. The TTL may be notified by the DNS server to the terminal device by using the domain name resolution response message in S404. Optionally, when the DNS caching record 1 includes the TTL, the terminal device and the DNS server may temporarily store the DNS caching record 1 in a synchronous manner. In this way, a time period during which the DNS caching record 1 is stored in the terminal device completely overlaps a time period during which the DNS caching record 1 is stored in the DNS server.

After S404, the terminal device may perform, based on the obtained IP address of the application server 1 and the obtained IP address 1 of the terminal device, data transmission with the application server 1. As shown in the figure, through the AN device 1 and the UPF entity 1, the terminal device may send uplink data to the application server 1 and receive downlink data sent by the application server 1.

S407: The SMF entity determines that it is required to re-select an anchor UPF entity for the terminal device.

Optionally, when the location of the terminal device moves (the terminal device accesses an AN device 2), the SMF entity determines, based on real-time location information 2 of the terminal device, that it is required to re-select the anchor UPF entity for the terminal device. Alternatively, the SMF entity may determine, based on a load status of the UPF entity 1, that it is required to re-select the anchor UPF entity.

S408: The SMF sends a NAS message to the terminal device, to instruct the terminal device to re-establish a PDU session.

S409: Similar to S401, the terminal device establishes a PDU session 2 through the network element devices in the core network and the AN device 2. In a PDU session 2 establishment procedure, the anchor UPF entity selected by the SMF entity is a UPF entity 2. Therefore, the UPF entity 2 participates in the PDU session 2 establishment procedure.

In the PDU session 2 establishment procedure, the SMF entity allocates an IP address 2 to the terminal device.

S410: When determining that the IP address of the terminal device changes, the terminal device determines whether the changed IP address (the IP address 2) of the terminal device is included in the at least one IP address indicated by the set information 1.

When determining that the changed IP address of the terminal device is not included in the at least one IP address indicated by the set information 1, the terminal device re-performs the DNS resolution on the domain name, that is, re-sends, through the AN device 2 and the UPF entity 2, a domain name resolution request message carrying the domain name to the DNS server.

The domain name resolution request message carries the location information 2 of the terminal device or the IP address 2 of the terminal device.

S411: The DNS server re-performs resolution on the domain name, to obtain an IP address of an application server 2 corresponding to the domain name, and determines set information 2 based on the location information 2 of the terminal device or the IP address 2 of the terminal device carried in the newly received domain name resolution request message.

The set information 2 indicates at least one IP address of the terminal device.

Similarly, for a manner in which the DNS server determines the set information 2 based on the location information 2 of the terminal device or the IP address 2 of the terminal device, refer to the description of step S303 in FIG. 3. Details are not described herein again.

S412: The DNS server sends a domain name resolution response message to the terminal device through the UPF entity 2 and the AN device 2. The domain name resolution response message includes the IP address of the application server 2 and the set information 2.

S413: The DNS server generates and temporarily stores a DNS caching record 2. The DNS caching record 2 includes the domain name, the set information 2, and the IP address of the application server 2.

S414: After receiving the domain name resolution response message, the terminal device generates and temporarily stores the DNS caching record 2.

The DNS caching record 2 generated by the terminal device includes same content as the DNS caching record 2 generated by the DNS server.

After S414, the terminal device may perform, based on the obtained IP address of the application server 2 and the obtained IP address 2 of the terminal device, data transmission with the application server 2. As shown in the figure, through the AN device 2 and the UPF entity 2, the terminal device may send uplink data to the application server 2 and receive downlink data sent by the application server 2.

In the foregoing example, the DNS server performs the resolution on the domain name requested by the terminal device, and then sends, to the terminal device, the IP address of the application server corresponding to the domain name obtained through the resolution and the set information indicating the at least one IP address of the terminal device. In this way, the terminal device can perform, based on the received IP address of the application server, the data transmission with the application server, and when the IP address of the terminal device changes and the changed IP address is not included in the at least one IP address indicated by the set information, the terminal device can re-perform the DNS resolution on the domain name. Due to mobility of the terminal device, when the changed IP address of the terminal device is not included in the at least one IP address, the application server previously obtained through the resolution is no longer the application server that is most suitable for the terminal device. In this case, according to the method in the foregoing example, the terminal device may obtain an IP address of another suitable application server by re-performing the DNS resolution on the domain name, thereby performing the data transmission with the application server. Therefore, in the solution, communication efficiency of the terminal device can be improved, and waste of transmission resources in a communications system is also avoided.

It should be noted that FIG. 4A and FIG. 4B show a domain name access example when the use condition information includes the set information. For a domain name access example when the use condition information includes the location range information and a domain name access example when the use condition information includes the set information and the location range information, refer to FIG. 4A and FIG. 4B. Details are not described in this application again.

Figure 5:
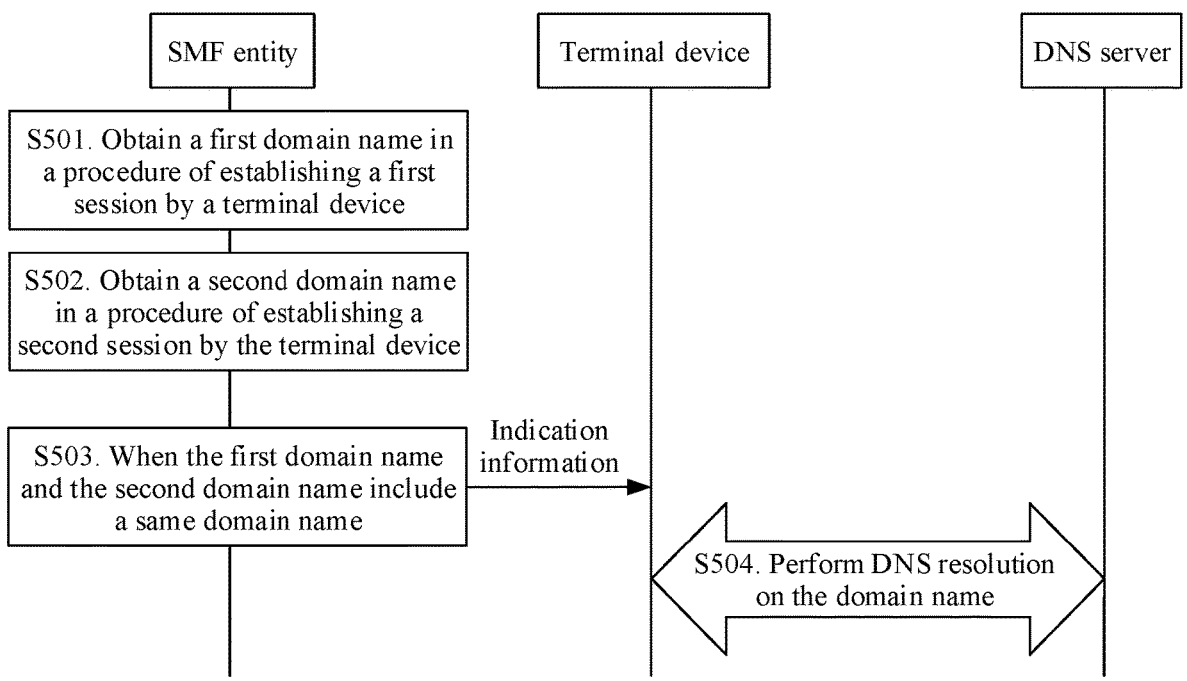
FIG. 5 is a flowchart of another domain name access method according to an embodiment of this application.

An embodiment of this application provides another domain name access method, applied to the communications system shown in FIG. 1. Referring to FIG. 5, a procedure of the method includes the following steps.

S501: In a procedure of establishing a first session by a terminal device, an SMF entity obtains a first domain name of an application server in a first DN accessed by the terminal device.

The first domain name includes a domain name corresponding to the application server included in the first DN. For example, the first domain name includes all domain names corresponding to all application servers included in the first DN.

Optionally, the SMF entity may obtain, from a PCF entity or an NEF entity in a communications system, the first domain name of the application server in the first DN.

After S501, through an anchor UPF entity determined in the procedure of establishing the first session, the terminal device may request a DNS server to perform resolution on a target domain name (included in the first domain name) required to be accessed, and perform data transmission with an application server corresponding to the target domain name in the first DN after the resolution succeeds.

S502: In a procedure of establishing a second session by the terminal device, the SMF entity obtains a second domain name of an application server in a second DN accessed by the terminal device.

Similar to S501, the SMF entity may alternatively obtain, from the PCF entity or the NEF entity, the second domain name of the application server in the second DN.

The second domain name includes a domain name corresponding to the application server included in the second DN. For example, the second domain name includes all domain names corresponding to all application servers included in the second DN.

The first DN and the second DN are different area networks. Due to mobility of the terminal device, when the terminal device moves after S501, when the second DN is closer to the terminal device than the first DN, the terminal device accesses the second DN that is closer to the terminal device, to save network resources. Therefore, the terminal device needs to access the second DN by establishing the second session.

Because each area network usually includes at least one application server and each application server corresponds to a corresponding domain name, the first domain name and the second domain name respectively include at least one domain name.

In addition, an application server corresponding to a same domain name may be deployed in different DNs. In this way, the terminal device can access the same domain name in different DNs.

S503: When the first domain name and the second domain name include the same domain name, the SMF entity sends indication information to the terminal device. The indication information is used to instruct the terminal device to perform DNS resolution on the domain name.

When the first domain name is completely different from the second domain name, there is no server corresponding to the target domain name in the second DN. Therefore, the terminal device needs to continue to perform the data transmission with the application server in the first DN, to access the target domain name.

When both the first domain name and the second domain name include the target domain name, it can be learned from the foregoing descriptions that, the distance between the second DN and the terminal device is smaller than the distance between the first DN and the terminal device, that is, the terminal device is closer to the application server in the second DN. Therefore, as compared with the manner in which the terminal device performs the data transmission with the application server in the first DN to access the target domain name, in the manner in which the terminal device performs the data transmission with the application server in the second DN to access the target domain name, communication efficiency of the terminal device is improved, and transmission resources in the communications system are saved.

Scenario 1: The SMF entity cannot determine the target domain name that has been accessed by the terminal device after the terminal device accesses the first DN.

In the scenario 1, the SMF entity determines, by determining whether the first domain name and the second domain name include the same domain name, whether it is required to send the indication information.

Optionally, that the first domain name and the second domain name include the same domain name includes any one of the following three cases.

The first case: The first domain name is completely the same as the second domain name (the first domain name and the second domain name have a same quantity of domain names and same domain names). For example, the first domain name includes Baidu and Sina; and the second domain name includes Baidu and Sina.

The second case: Each domain name in the first domain name is included in the second domain name (the quantity of domain names included in the second domain name is greater than the quantity of domain names included in the first domain name). For example, the first domain name includes Baidu and Sina; and the second domain name includes Baidu, Sina, and Tencent.

The third case: The first domain name and the second domain name include at least one same domain name. In other words, some domain names in the first domain name are included in the second domain name. For example, the first domain name includes Baidu and Sina; and the second domain name includes Sina and Tencent.

In the first case and the second case, the second domain name definitely includes the target domain name that has been accessed by the terminal device when the terminal device accesses the first DN. However, in the third case, the second domain name may include the target domain name. Therefore, in the first case and the second case, the SMF entity sends the indication information to the terminal device, and the terminal device communicates with the application server in the second DN, to access the target domain name. Therefore, in the method, the communication efficiency of the terminal device can be improved, and the transmission resources in the communications system can be saved. However, in the foregoing third case, the SMF entity sends the indication information to the terminal device, and the terminal device may communicate with the application server in the second DN, to access the target domain name. In the method, the communication efficiency of the terminal device may be improved.

In a possible embodiment of the scenario 1, the indication information includes no domain name. In this way, the indication information can instruct the terminal device to perform the DNS resolution on the domain name accessed by the terminal device after the terminal device accesses the first DN; or instruct the terminal device to perform the DNS resolution on all the domain names currently accessed by the terminal device.

In another possible embodiment of the scenario 1, the indication information further includes the first domain name (or the second domain name). In this way, the indication information can instruct the terminal device to perform the DNS resolution on the domain name that is currently accessed by the terminal device and that is in the first domain name (or the second domain name).

Scenario 2: The SMF entity can determine the target domain name that has been accessed by the terminal device after the terminal device accesses the first DN.

In the scenario 2, when the first domain name and the second domain name determined by the SMF entity in S503 include the target domain name, the SMF entity sends the indication information to the terminal device.

In a possible embodiment of the scenario 2, the indication information includes the target domain name. In this way, the indication information can instruct the terminal device to perform the DNS resolution on the target domain name, thereby improving pertinence of the indication information and further resolving the problem of waste of resources.

S504: After receiving the indication information, the terminal device performs the DNS resolution on the domain name.

Optionally, the domain name may be the domain name accessed by the terminal device after the terminal device accesses the first DN, or the domain name currently accessed by the terminal device, or the domain name in the first domain name (or the second domain name) currently accessed by the terminal device, or the target domain name notified by the SMF entity by using the indication information.

Optionally, for a process in which the terminal device performs the DNS resolution on the domain name, refer to the procedure of the domain name access method shown in FIG. 3 or FIG. 4A and FIG. 4B. Details are not described herein again.

According to the method provided in this embodiment of this application, when determining that the second domain name in the second DN currently accessed by the terminal device includes the same domain name as the first domain name in the first DN previously accessed by the terminal device, the SMF entity instructs the terminal device to re-perform the DNS resolution on the domain name. In this way, the terminal device can re-perform the DNS resolution on the domain name, to obtain a more suitable application server in the second DN, and then perform the data transmission with the application server, to access the domain name. Therefore, in the solution, the communication efficiency of the terminal device can be improved, and the waste of the transmission resources in the communications system is also avoided.

Figure 6B:
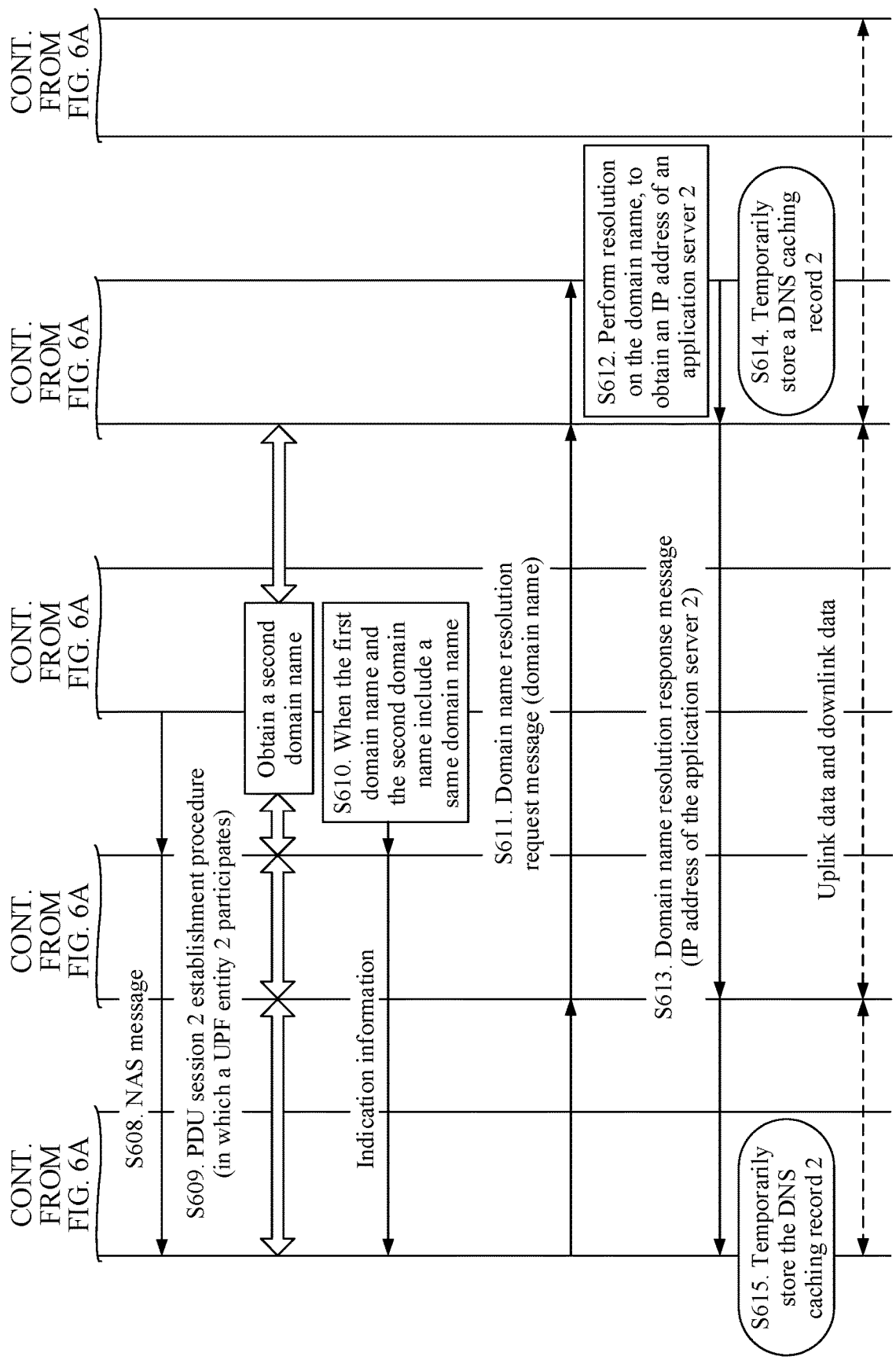

Based on the domain name access method provided in the embodiment shown in FIG. 5, an embodiment of this application further provides an example of the domain name access method. The example is applied to the communications system shown in FIG. 1. Referring to FIG. 6A and FIG. 6B, a procedure of the example includes the following steps.

S601: When a terminal device requests to access a first DN, the terminal device establishes a PDU session 1 through network element devices (an AMF entity, an SMF entity, and an anchor UPF entity selected by the SMF entity a UPF entity 1) in a core network and an AN device 1. In the PDU session 1 establishment procedure, the SMF entity obtains a first domain name of an application server in the first DN.

In the PDU session 1 establishment procedure, the SMF entity allocates an IP address 1 to the terminal device.

Optionally, the SMF entity may obtain the first domain name from a PCF entity in the communications system. For example, in the session establishment procedure shown in FIG. 2A and FIG. 2B, the SMF entity may obtain the first domain name from the PCF entity in the process of performing S206 or S208. Alternatively, the SMF entity may obtain the first domain name from an NEF entity. For example, the SMF entity may obtain the first domain name from the NEF entity in a process of obtaining subscription data.

S602: After establishing the PDU session 1 successfully, the terminal device sends, through the AN device 1 and the UPF entity 1 when the terminal device needs to access an application server corresponding to a domain name, a domain name resolution request message carrying the domain name to a DNS server.

S603: The DNS server performs resolution on the domain name, to obtain an IP address of an application server 1 in the first DN corresponding to the domain name.

Optionally, the DNS server may alternatively determine, based on location information 1 of the terminal device or an IP address 1 of the terminal device carried in the domain name resolution request message, use condition information 1 of the IP address of the application server 1. For the specific process, refer to the description of S303 in FIG. 3. Details are not described herein again.

S604: The DNS server sends a domain name resolution response message to the terminal device through the UPF entity 1 and the AN device 1. The domain name resolution response message includes the IP address of the application server 1.

Optionally, the domain name resolution response message further includes the use condition information 1.

S605: The DNS server generates and temporarily stores a DNS caching record 1. The DNS caching record 1 includes the domain name and the IP address of the application server 1.

Optionally, the DNS caching record 1 further includes the use condition information 1.

S606: After receiving the domain name resolution response message, the terminal device generates and temporarily stores the DNS caching record 1.

The DNS caching record 1 generated by the terminal device includes same content as the DNS caching record 1 generated by the DNS server.

Optionally, the DNS caching record 1 may further include TTL of the DNS caching record 1. The TTL may be notified by the DNS server to the terminal device by using the domain name resolution response message in S604. Optionally, when the DNS caching record 1 includes the TTL, the terminal device and the DNS server may temporarily store the DNS caching record 1 in a synchronous manner. In this way, a time period during which the DNS caching record 1 is stored in the terminal device completely overlaps a time period during which the DNS caching record 1 is stored in the DNS server.

After S604, the terminal device may perform, based on the obtained IP address of the application server 1 and the obtained IP address 1 of the terminal device, data transmission with the application server 1. As shown in the figure, through the AN device 1 and the UPF entity 1, the terminal device may send uplink data to the application server 1 and receive downlink data sent by the application server 1.

S607: The SMF entity determines that it is required to re-select an anchor UPF entity for the terminal device.

Optionally, when a location of the terminal device moves (the terminal device accesses an AN device 2, for example, the terminal device moves near a second DN), the terminal device may determine, based on real-time location information 2 of the terminal device, that it is required to re-select the anchor UPF entity for the terminal device. Alternatively, the SMF entity may determine, based on a load status of the UPF entity 1, that it is required to re-select the anchor UPF entity.

S608: The SMF sends a NAS message to the terminal device, to instruct the terminal device to re-establish a PDU session.

S609: Similar to S601, the terminal device establishes a PDU session 2 through network element devices (the AMF entity, the SMF entity, and an anchor UPF entity selected by the SMF entity a UPF entity 2) in the core network and the AN device 2. In the PDU session 2 establishment procedure, the SMF entity obtains a second domain name of an application server in the second DN.

In the PDU session 2 establishment procedure, the SMF entity allocates an IP address 2 to the terminal device.

S610: When determining that the first domain name and the second domain name include a same domain name, the SMF entity sends indication information to the terminal device. The indication information is used to instruct the terminal device to perform DNS resolution on a domain name currently accessed by the terminal device.

For step S610, refer to the description of S503 in FIG. 5. Details are not described herein again.

S611: After receiving the indication information, the terminal device re-performs the DNS resolution on the domain name, that is, re-sends, through the AN device 2 and the UPF entity 2, a domain name resolution request message carrying the domain name to the DNS server.

S612: The DNS server re-performs the resolution on the domain name, to obtain an IP address of an application server 2 in the second DN corresponding to the domain name.

Optionally, the DNS server may alternatively determine, based on location information 2 of the terminal device or an IP address 2 of the terminal device carried in the newly received domain name resolution request message, use condition information 2 of the IP address of the application server 2. For the specific process, refer to the description of S303 in FIG. 3. Details are not described herein again.

S613: The DNS server sends a domain name resolution response message to the terminal device through the UPF entity 2 and the AN device 2. The domain name resolution response message includes the IP address of the application server 2.

Optionally, the domain name resolution response message further includes the use condition information 2.

S614: The DNS server generates and temporarily stores a DNS caching record 2. The DNS caching record 2 includes the domain name and the IP address of the application server 2.

Optionally, the DNS caching record 2 further includes the use condition information 2.

S615: After receiving the domain name resolution response message, the terminal device generates and temporarily stores the DNS caching record 2.

The DNS caching record 2 generated by the terminal device includes same content as the DNS caching record 2 generated by the DNS server.

After S613, the terminal device may perform, based on the obtained IP address of the application server 2 and the obtained IP address 2 of the terminal device, data transmission with the application server 2. As shown in the figure, through the AN device 2 and the UPF entity 2, the terminal device may send uplink data to the application server 2 and receive downlink data sent by the application server 2.

In the foregoing example, when determining that the second domain name in the second DN currently accessed by the terminal device includes the same domain name as the first domain name in the first DN previously accessed by the terminal device, the SMF entity instructs the terminal device to re-perform the DNS resolution on the domain name. In this way, the terminal device can re-perform the DNS resolution on the domain name, to obtain a more suitable application server in the second DN, and then perform the data transmission with the application server, to access the domain name. Therefore, in the solution, the communication efficiency of the terminal device can be improved, and the waste of the transmission resources in the communications system is also avoided.

Figure 7:
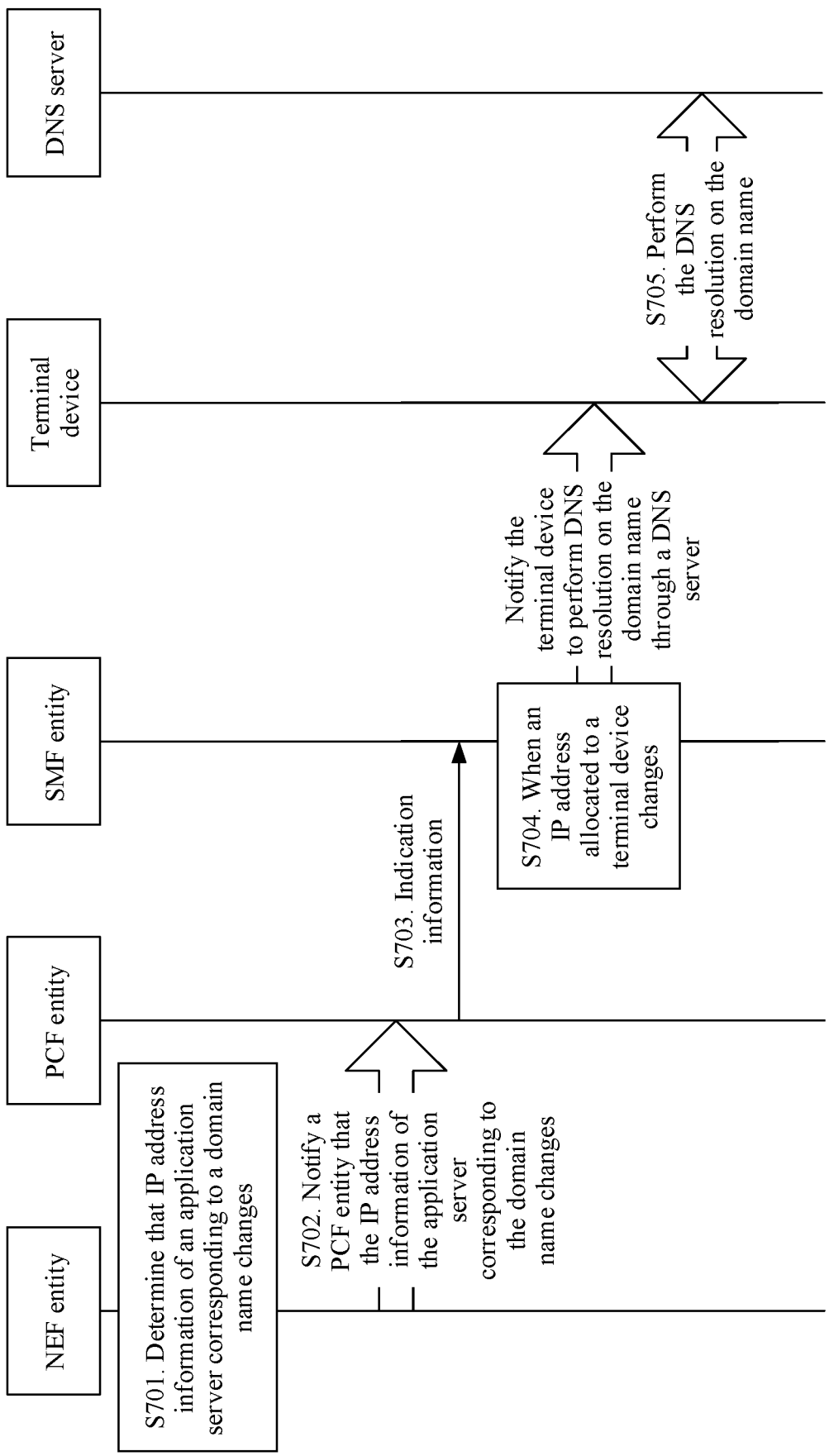
FIG. 7 is a flowchart of still another domain name access method according to an embodiment of this application.

An embodiment of this application provides still another domain name access method, applied to the communications system shown in FIG. 1. Referring to FIG. 7, a procedure of the method includes the following steps.

S701: An NEF entity determines that IP address information of an application server corresponding to a domain name changes.

The IP address information of the application server is a data network access identifier (DNAI) of the application server. The DNAI of the application server may be used to indicate a location of the application server.

The NEF entity stores a correspondence between the domain name and the IP address information of the application server.

Because the application server usually needs to interact with a PCF entity through the NEF entity, in the interaction process between the application server and the PCF entity, the NEF entity translates an IP address of the application server into the DNAI of the application server, thereby generating the correspondence between the domain name and the DNAI of the application server.

For example, when the application server sends an application function traffic steering request message to the PCF entity through the NEF entity, the NEF entity may determine the DNAI of the application server based on the IP address of the application server, determine the domain name corresponding to the application server, generate the correspondence between the domain name and the DNAI of the application server, and store the correspondence. Optionally, when the terminal device moves to a location range to which a DN in which the application server is located belongs, the application server may be triggered to send the application function traffic steering request message.

When the NEF entity previously stores a correspondence between the domain name and a DNAI of another application server, the NEF entity replaces the correspondence with the newly generated correspondence between the domain name and the DNAI of the application server. In this case, the NEF entity may determine that the DNAI of the application server corresponding to the domain name changes.

S702: The NEF entity notifies the PCF entity that the IP address information of the application server corresponding to the domain name changes.

Optionally, the NEF entity sends an IP address information change notification message to the PCF entity, to notify the PCF entity that the IP address information of the application server corresponding to the domain name changes.

S703: The PCF entity learns, from the NEF entity, that the IP address information of the application server corresponding to the domain name changes, and then sends indication information to the SMF entity. The indication information is used to instruct the SMF entity to notify, when an IP address allocated by the SMF entity to the terminal device changes, the terminal device to perform DNS resolution on the domain name.

A change in the DNAI corresponding to the domain name in the NEF entity indicates adding of one application server corresponding to the domain name to a communications system. When the IP address changes due to movement of the terminal device, the application server closest to the terminal device may also change (which may change to an application server to which the updated DNAI corresponding to the domain name belongs). Therefore, it is required to instruct the SMF entity through S703 to notify, when the IP address allocated by the SMF entity to the terminal device changes, the terminal device to re-perform the DNS resolution on the domain name.

The application server obtained each time through resolution by the DNS server for the terminal device is closest to (most suitable for) the terminal device, and when the IP address of the terminal device does not change, no relatively large change occurs in the location of the terminal device. Therefore, the application server corresponding to the domain name previously obtained through the DNS resolution is still more likely to be the application server closest to the terminal device, and no DNS resolution needs to be re-performed on the domain name. On the contrary, when the IP address of the terminal device changes, it indicates that a relatively large change has occurred in the location of the terminal device. The application server corresponding to the domain name previously obtained through the DNS resolution is more likely not to be the application server closest to the terminal device. Therefore, the DNS resolution needs to be re-performed on the domain name, to obtain another more suitable application server, thereby ensuring communication efficiency of the terminal device and avoiding waste of transmission resources.

Optionally, in this embodiment of this application, the indication information may further be used to instruct the SMF entity to reconfigure a user plane of the terminal device, to start a procedure of re-allocating the IP address to the terminal device.

S704: After receiving the indication information from the PCF entity, the SMF entity notifies, based on the indication information when the IP address allocated by the SMF entity to the terminal device changes, the terminal device to perform the DNS resolution on the domain name.

Optionally, the SMF entity may send resolution indication information to the terminal device, to notify the terminal device to re-perform the DNS resolution on the domain name.

S705: After learning from the SMF entity that the DNS resolution needs to be performed on the domain name, the terminal device performs the DNS resolution on the domain name.

Optionally, for a process in which the terminal device performs the DNS resolution on the domain name, refer to the procedure of the domain name access method shown in FIG. 3 or FIG. 4A and FIG. 4B. Details are not described herein again.

According to the method provided in this embodiment of this application, after determining that the IP address information of the application server corresponding to the domain name changes, the NEF entity instructs, through the PCF entity, the SMF entity to notify, when the IP address allocated by the SMF entity to the terminal device changes, the terminal device to re-perform the DNS resolution on the domain name. In this way, the terminal device can obtain a more suitable application server by re-performing the resolution, and further perform data transmission with the application server, to access the domain name. Therefore, in the solution, the communication efficiency of the terminal device can be improved, and the waste of the transmission resources of the communications system is also avoided.

Figure 8A:
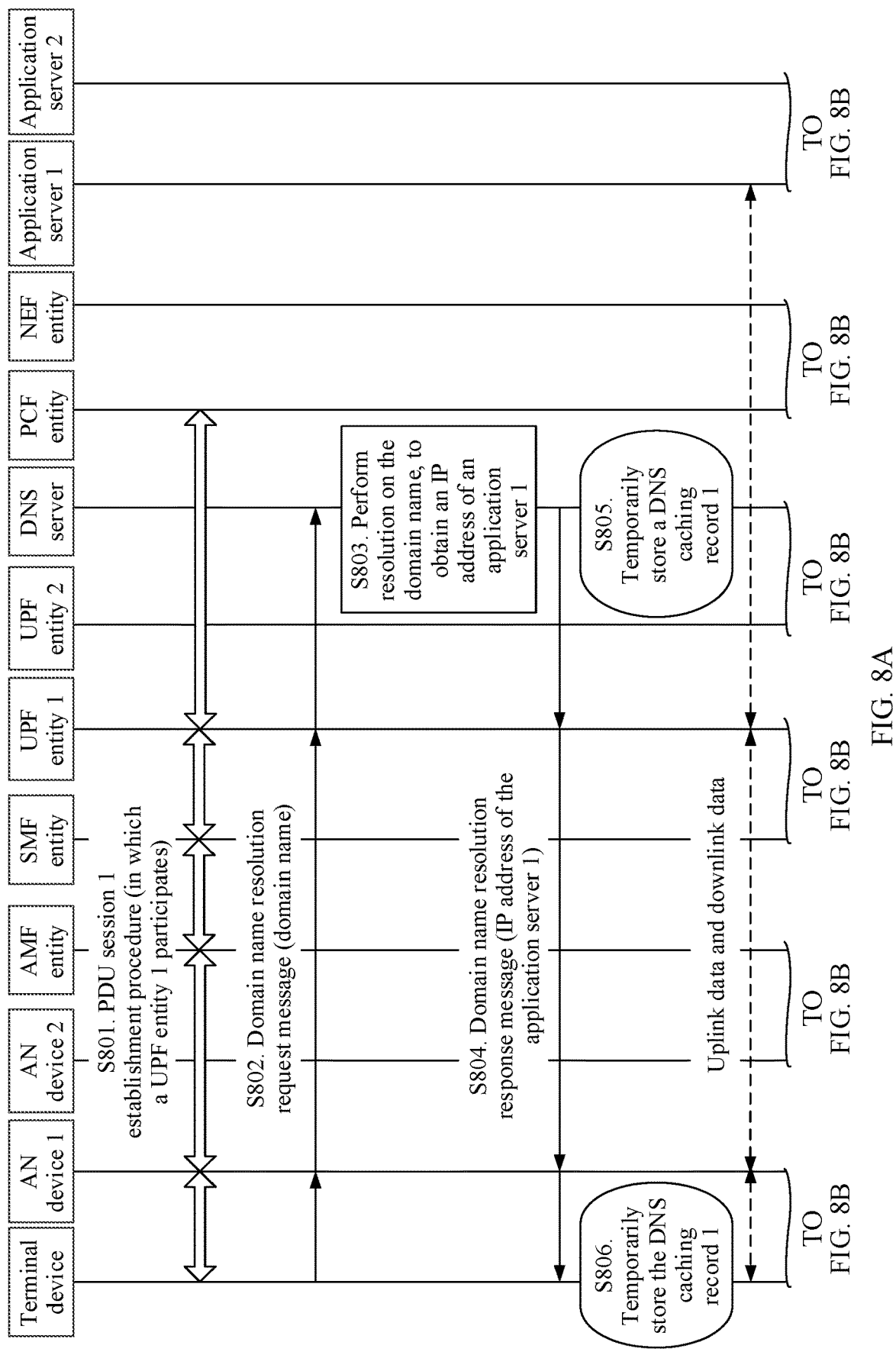
Figure 8B:
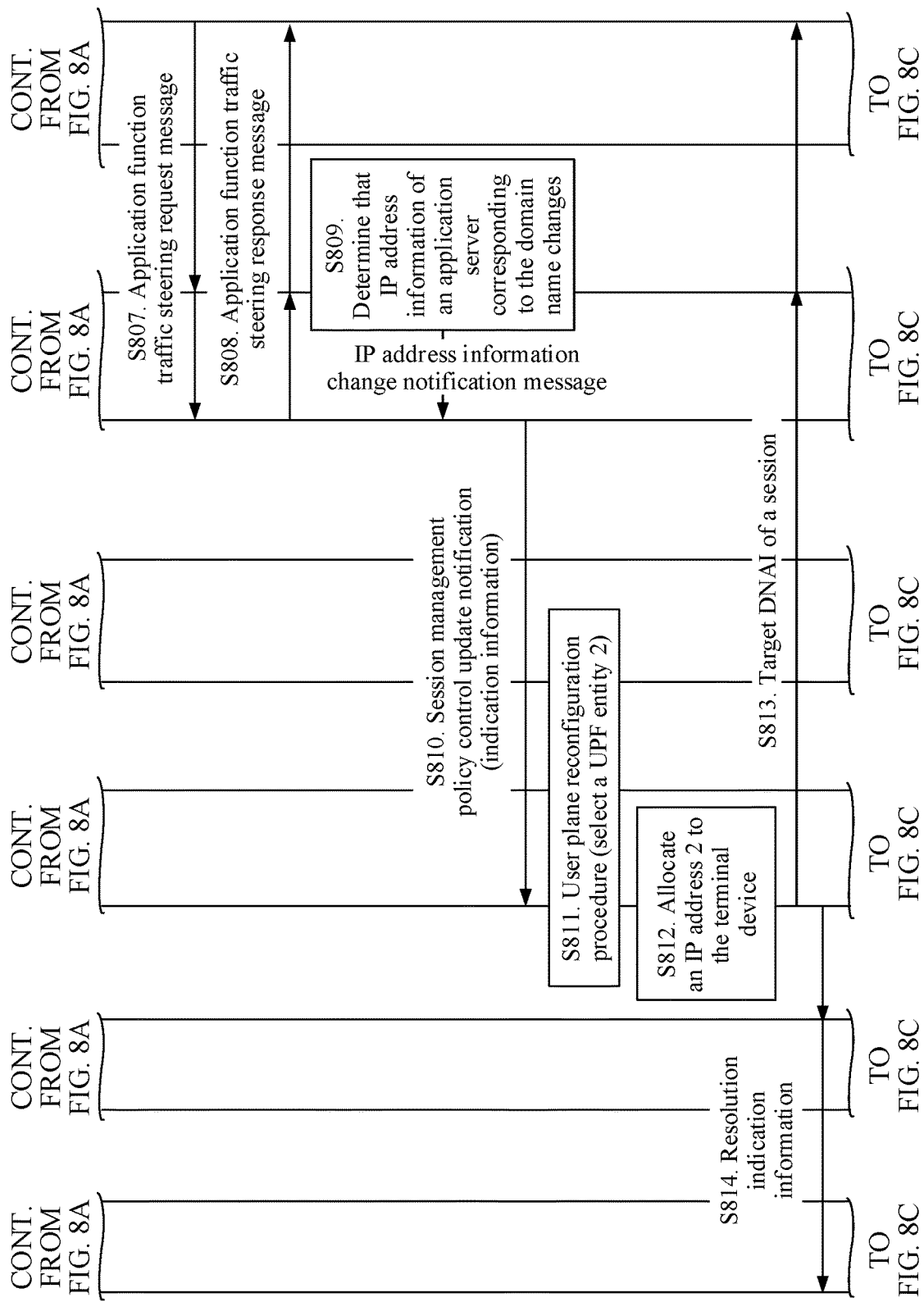

Based on the domain name access method provided in the embodiment shown in FIG. 7, an embodiment of this application further provides an example of the domain name access method. The example is applied to the communications system shown in FIG. 1. An NEF entity in the communications system may store a correspondence between a domain name and IP address information of an application server. Referring to FIG. 8A, FIG. 8B, and FIG. 8C, a procedure of the example includes the following steps.

S801: A terminal device establishes a PDU session 1 through network element devices (an AMF entity, an SMF entity, an anchor UPF entity selected by the SMF entity—a UPF entity 1, and a PCF entity) in a core network and an AN device 1.

In the PDU session 1 establishment procedure, the SMF entity allocates an IP address 1 to the terminal device.

S802: After establishing the PDU session 1 successfully, the terminal device sends, through the AN device 1 and the UPF entity 1 when the terminal device needs to access a domain name, a domain name resolution request message carrying the domain name to a DNS server.

S803: The DNS server performs resolution on the domain name, to obtain an IP address of an application server 1 corresponding to the domain name.

Because a DNAI of an application server corresponding to the domain name stored in the NEF entity is a DNAI of the application server 1, the DNS server obtains the application server 1 corresponding to the domain name through resolution.

Optionally, the DNS server may alternatively determine, based on location information 1 of the terminal device or an IP address 1 of the terminal device carried in the domain name resolution request message, use condition information 1 of the application server 1. For the specific process, refer to the description of S303 in FIG. 3. Details are not described herein again.

S804: The DNS server sends a domain name resolution response message to the terminal device through the UPF entity 1 and the AN device 1. The domain name resolution response message includes the IP address of the application server 1.

Optionally, the domain name resolution response message further includes the use condition information 1.

S805: The DNS server generates and temporarily stores a DNS caching record 1. The DNS caching record 1 includes the domain name and the IP address of the application server 1.

Optionally, the DNS caching record 1 further includes the use condition information 1.

S806: After receiving the domain name resolution response message, the terminal device generates and temporarily stores the DNS caching record 1.

The DNS caching record 1 generated by the terminal device includes same content as the DNS caching record 1 generated by the DNS server.

Optionally, the DNS caching record 1 may further include TTL of the DNS caching record 1. The TTL may be notified by the DNS server to the terminal device by using the domain name resolution response message in S804. Optionally, when the DNS caching record 1 includes the TTL, the terminal device and the DNS server may temporarily store the DNS caching record 1 in a synchronous manner. In this way, a time period during which the DNS caching record 1 is stored in the terminal device completely overlaps a time period during which the DNS caching record 1 is stored in the DNS server.

After S804, the terminal device may perform, based on the obtained IP address of the application server 1 and the obtained IP address 1 of the terminal device, data transmission with the application server 1. As shown in the figure, through the AN device 1 and the UPF entity 1, the terminal device may send uplink data to the application server 1 and receive downlink data sent by the application server 1.

S807: An application server 2 corresponding to the domain name sends an application function traffic steering request message to the PCF entity through an NEF entity. The NEF entity forwards the application function traffic steering request message to the PCF entity.

S808: The PCF entity returns an application function traffic steering response message to the application server 2 through the NEF entity.

S809: When forwarding the application function traffic steering request message, the NEF entity obtains an IP address of the application server 2, translates the IP address of the application server 2 into a DNAI of the application server 2, and generates and stores a correspondence between the domain name and the DNAI of the application server 2. Because the DNAI of the application server corresponding to the domain name stored in the NEF entity changes from the DNAI of the application server 1 to the DNAI of the application server 2, the NEF entity determines that IP address information of the application server corresponding to the domain name changes, and sends an IP address information change notification message to the PCF entity, to notify the PCF entity that the IP address information of the application server corresponding to the domain name changes.

S810: The PCF entity triggers the SMF entity to update a PCC rule of the session, and sends indication information to the SMF entity. The indication information is used to instruct the SMF entity to notify, when an IP address allocated by the SMF entity to the terminal device changes, the terminal device to perform DNS resolution on the domain name.

For example, the PCF entity sends a session management policy control update notification to the SMF entity. The session management policy control update notification includes the indication information.

S811: The SMF entity initiates a user plane reconfiguration procedure of the terminal device, and an anchor UPF entity re-selected for the terminal device in the user plane reconfiguration procedure is a UPF entity 2.

S812: The SMF entity re-allocates an IP address, that is, an IP address 2, to the terminal device.

S813: The SMF entity notifies, through the NEF entity, the application server 2 that target DNAI information of the session is the DNAI of the application server 2.

S814: When determining that the IP address allocated to the terminal device changes, the SMF entity sends resolution indication information to the terminal device through the AMF entity, to notify the terminal device to perform the DNS resolution on the domain name.

S815: After receiving the resolution indication information, the terminal device re-performs the DNS resolution on the domain name, that is, re-sends, through the AN device 2 and the UPF entity 2, a domain name resolution request message carrying the domain name to the DNS server.

S816: The DNS server re-performs the resolution on the domain name, to obtain the IP address of the application server 2 corresponding to the domain name.

Optionally, the DNS server may alternatively determine, based on location information 2 of the terminal device or an IP address 2 of the terminal device carried in the newly received domain name resolution request message, use condition information 2 of the IP address of the application server 2.

S817: The DNS server sends a domain name resolution response message to the terminal device through the UPF entity 2 and the AN device 2. The domain name resolution response message includes the IP address of the application server 2.

Optionally, the domain name resolution response message further includes the use condition information 2.

S818: The DNS server generates and temporarily stores a DNS caching record 2. The DNS caching record 2 includes the domain name and the IP address of the application server 2.

Optionally, the DNS caching record 2 further includes the use condition information 2.

S819: After receiving the domain name resolution response message, the terminal device generates and temporarily stores the DNS caching record 2.

The DNS caching record 2 generated by the terminal device includes same content as the DNS caching record 2 generated by the DNS server.

After S817, the terminal device may perform, based on the obtained IP address of the application server 2 and the obtained IP address 2 of the terminal device, data transmission with the application server 2. As shown in the figure, through the AN device 2 and the UPF entity 2, the terminal device may send uplink data to the application server 2 and receive downlink data sent by the application server 2.

In the foregoing example, after determining that the IP address information of the application server corresponding to the domain name changes, the NEF entity instructs, through the PCF entity, the SMF entity to notify, when the IP address allocated by the SMF entity to the terminal device changes, the terminal device to re-perform the DNS resolution on the domain name. In this way, the terminal device can obtain a more suitable application server by re-performing the DNS resolution, and further perform data transmission with the application server, to access the domain name. Therefore, in the solution, the communication efficiency of the terminal device can be improved, and the waste of the transmission resources of the communications system is also avoided.

It should be noted that each message of each figure in the embodiments of this application may have another name. In addition, information between the network elements may alternatively be transferred by invoking network functions of the network elements in a service-based architecture. This is not limited in the embodiments of this application. The IP address in the foregoing embodiments may be an IPv4 address or an IPv6 prefix.

In addition, it should further be noted that the DNS includes a plurality of DNS servers, and the plurality of DNS servers may be distributed in the DNS in a hierarchical architecture. Therefore, in the foregoing embodiments, a first DNS server that performs DNS resolution on a domain name for the first time may be the same as or different from a second DNS server that re-performs the DNS resolution on the domain name. When the first DNS server is different from the second DNS server, the first DNS server and the second DNS server may be different DNS servers in a same hierarchy. For example, both the first DNS server and the second DNS server are local DNS servers or root DNS servers. Alternatively, the first DNS server and the second DNS server are DNS servers in different hierarchies. This is not limited in this application. In the figures corresponding to the foregoing embodiments, the first DNS server and the second DNS server are viewed as the same DNS server only for an illustrative purpose. Therefore, the foregoing embodiments do not constitute a limitation to this application.

Figure 9:
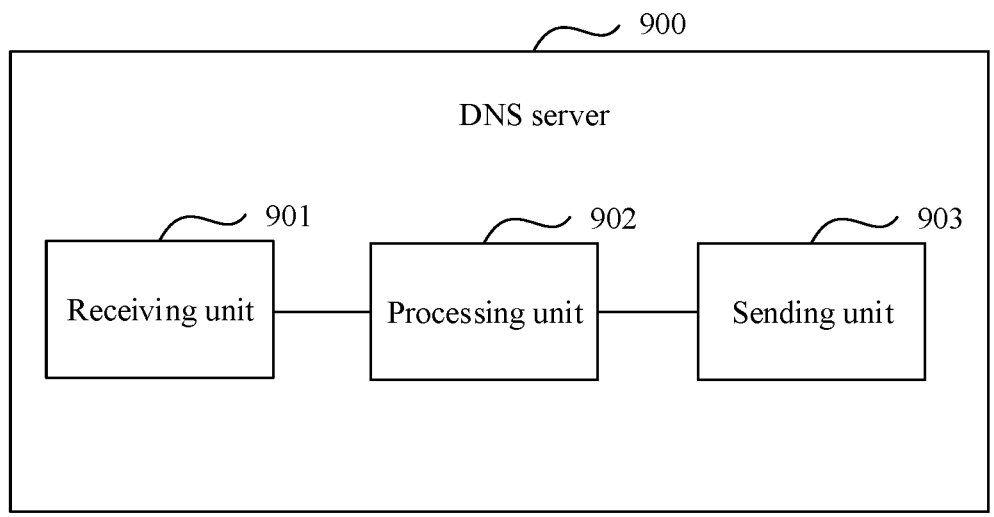
FIG. 9 is a structural diagram of a first DNS server according to an embodiment of this application.

Based on the foregoing embodiments, this application further provides a DNS server. The DNS server may be applied to the communications system shown in FIG. 1, to implement the domain name access method shown in FIG. 3 or FIG. 4A and FIG. 4B. As shown in FIG. 9, the DNS server 900 includes: a receiving unit 901, a processing unit 902, and a sending unit 903.

The receiving unit 901 is configured to receive a request message from a terminal device, where the request message includes a domain name requested by the terminal device.

The processing unit 902 is configured to perform resolution on the domain name, to obtain an Internet Protocol IP address of an application server corresponding to the domain name.

The sending unit 903 is configured to send a response message to the terminal device, where the response message includes the IP address of the application server and use condition information, and the use condition information indicates a condition in which the terminal device accesses the domain name by using the IP address of the application server.

Optionally, the use condition information includes at least one of the following: set information and location range information. The set information indicates at least one IP address of the terminal device, and the location range information indicates a location range in which the terminal device is located.

Optionally, the processing unit 902 is further configured to:

determine the use condition information based on the request message.

Optionally, the request message further includes location information of the terminal device or the IP address of the terminal device.

When determining the use condition information based on the request message, the processing unit 902 is specifically configured to:

determine the use condition information based on the location information of the terminal device or the IP address of the terminal device included in the request message.

Optionally, the sending unit 903 is further configured to:

send indication information to the terminal device, where the indication information is used to instruct the terminal device to perform DNS resolution on the domain name when the terminal device does not satisfy the condition indicated by the use condition information.

This embodiment of this application provides a DNS server. The DNS server performs the resolution on the domain name requested by the terminal device, and then sends, to the terminal device, the IP address of the application server corresponding to the domain name obtained through the resolution and the use condition information indicating the condition that should be satisfied when the terminal device can access the domain name by using the IP address of the application server. In this way, the terminal device can perform, based on the received IP address of the application server, data transmission with the application server, and when information of the terminal device changes due to movement of the terminal device and the terminal device no longer satisfies the condition indicated by the use condition information, the terminal device can re-perform the DNS resolution on the domain name. When the information of the terminal device changes and the terminal device no longer satisfies the condition indicated by the use condition information, the application server previously obtained through the resolution may no longer be the application server that is most suitable for the terminal device. In this case, according to the solution, the terminal device may obtain another suitable application server by re-performing the DNS resolution on the domain name. Therefore, in the solution, communication efficiency of the terminal device can be improved, and waste of transmission resources in a communications system is also avoided.

In addition, the receiving unit 901, the processing unit 902, and the sending unit 903 in the DNS server 900 may further implement another operation or function of the DNS server in the foregoing method. Details are not described herein again.

Figure 10:
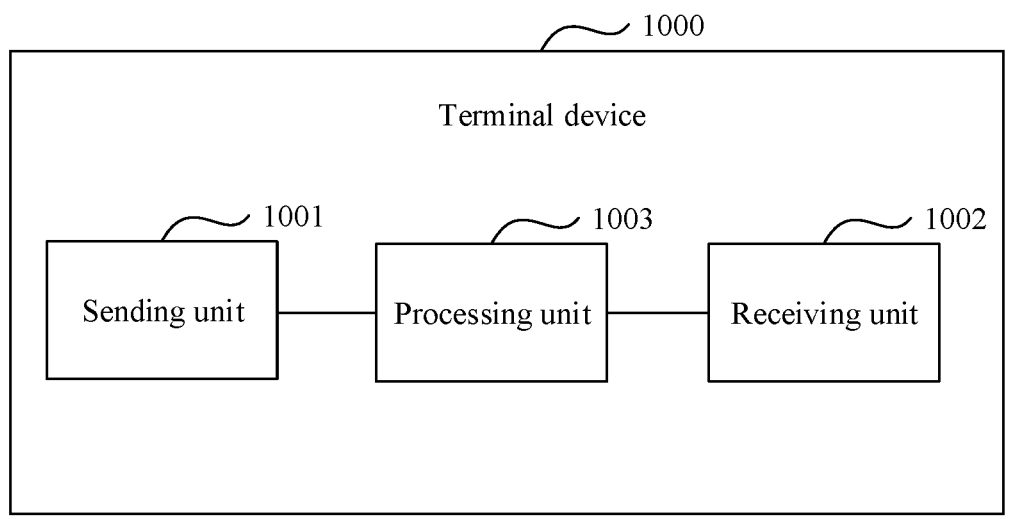
FIG. 10 is a structural diagram of a first terminal device according to an embodiment of this application.

Based on the foregoing embodiments, this application further provides a terminal device. The terminal device may be applied to the communications system shown in FIG. 1, to implement the domain name access method shown in FIG. 3 or FIG. 4A and FIG. 4B. Referring to FIG. 10, the terminal device 1000 includes a sending unit 1001, a receiving unit 1002, and a processing unit 1003.

The sending unit 1001 is configured to send a request message to a domain name system DNS server, where the request message includes a domain name requested by the terminal device.

The receiving unit 1002 is configured to receive a response message from the DNS server, where the response message includes an Internet Protocol IP address of an application server and use condition information, the application server corresponds to the domain name, and the use condition information indicates a condition in which the terminal device accesses the domain name by using the IP address of the application server.

The processing unit 1003 is configured to perform DNS resolution on the domain name when the terminal device does not satisfy the condition indicated by the use condition information.

Optionally, the receiving unit 1002 is further configured to receive indication information from the DNS server, where the indication information is used to instruct the terminal device to perform the DNS resolution on the domain name when the terminal device does not satisfy the condition indicated by the use condition information.

The processing unit 1003 is further configured to determine, based on the indication information, whether the terminal device satisfies the condition indicated by the use condition information.

Optionally, the use condition information includes at least one of the following: set information and location range information. The set information indicates at least one IP address of the terminal device, and the location range information indicates a location range in which the terminal device is located.

When the use condition information includes the set information, that the terminal device does not satisfy the condition indicated by the use condition information includes: an IP address of the terminal device changes and the changed IP address of the terminal device is not included in the at least one IP address indicated by the set information; and/or when the use condition information includes the location range information, that the terminal device does not satisfy the condition indicated by the use condition information includes: a location of the terminal device changes and the changed location of the terminal device is not within the location range indicated by the location range information.

Optionally, the processing unit 1003 is further configured to:

temporarily store a DNS caching record after the receiving unit 1002 receives the response message from the DNS server, where the DNS caching record includes the domain name, the use condition information, and the IP address of the application server.

Optionally, the DNS caching record further includes time to live TTL of the DNS caching record.

When determining that the terminal device does not satisfy the condition indicated by the use condition information, the processing unit 1003 is specifically configured to:

determine that the terminal device does not satisfy, within the TTL, the condition indicated by the use condition information.

This embodiment of this application provides a terminal device. The terminal device performs the DNS resolution on the domain name, and then obtains the IP address of the application server corresponding to the domain name and the use condition information indicating the condition that should be satisfied when the terminal device can access the domain name by using the IP address of the application server. In this way, the terminal device can perform, based on the received IP address of the application server, data transmission with the application server, and when information of the terminal device changes due to movement of the terminal device and the terminal device no longer satisfies the condition indicated by the use condition information, the terminal device can re-perform the DNS resolution on the domain name. When the information of the terminal device changes and the terminal device no longer satisfies the condition indicated by the use condition information, the application server previously obtained through the resolution may no longer be the application server that is most suitable for the terminal device. In this case, according to the solution, the terminal device may obtain another suitable application server by re-performing the DNS resolution on the domain name. Therefore, in the solution, communication efficiency of the terminal device can be improved, and waste of transmission resources in a communications system is also avoided.

In addition, the sending unit 1001, the receiving unit 1002, and the processing unit 1003 in the terminal device 1000 may further implement another operation or function of the terminal device in the foregoing method. Details are not described herein again.

Figure 11:
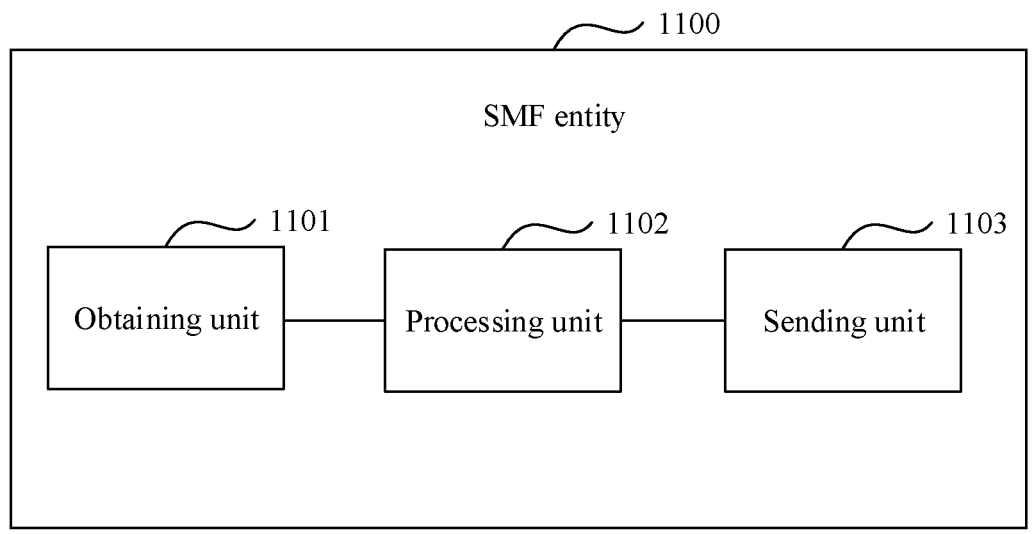
FIG. 11 is a structural diagram of a first SMF entity according to an embodiment of this application.

Based on the foregoing embodiments, this application further provides an SMF entity. The SMF entity may be applied to the communications system shown in FIG. 1, to implement the domain name access method shown in FIG. 5 or FIG. 6A and FIG. 6B. As shown in FIG. 11, the SMF entity 1100 includes: an obtaining unit 1101, a processing unit 1102, and a sending unit 1103.

The obtaining unit 1101 is configured to: obtain, in a procedure of establishing a first session by a terminal device, a first domain name of an application server in a first data network DN accessed by the terminal device; and obtain, in a procedure of establishing a second session by the terminal device, a second domain name of an application server in a second DN accessed by the terminal device.

The processing unit 1102 is configured to send indication information to the terminal device through the sending unit 1103 when the first domain name and the second domain name include a same domain name, where the indication information is used to instruct the terminal device to perform DNS resolution on the domain name.

The sending unit 1103 is configured to send the indication information to the terminal device.

Optionally, when obtaining the first domain name of the application server in the first DN, the obtaining unit 1101 is specifically configured to:

obtain, from a policy control function PCF entity or a network exposure function NEF entity, the first domain name of the application server in the first DN.

Optionally, the indication information further includes the first domain name or the second domain name.

This embodiment of this application provides an SMF entity. When determining that the second domain name in the second DN currently accessed by the terminal device includes the same domain name as the first domain name in the first DN previously accessed by the terminal device, the SMF entity instructs the terminal device to re-perform the DNS resolution on the domain name. In this way, the terminal device can re-perform the DNS resolution on the domain name, to obtain a more suitable application server in the second DN, and then perform the data transmission with the application server, to access the domain name. Therefore, in the solution, communication efficiency of the terminal device can be improved, and waste of transmission resources in a communications system is also avoided.

In addition, the obtaining unit 1101, the processing unit 1102, and the sending unit 1103 in the SMF entity 1100 may further implement another operation or function of the SMF entity in the foregoing method. Details are not described herein again.

Figure 12:
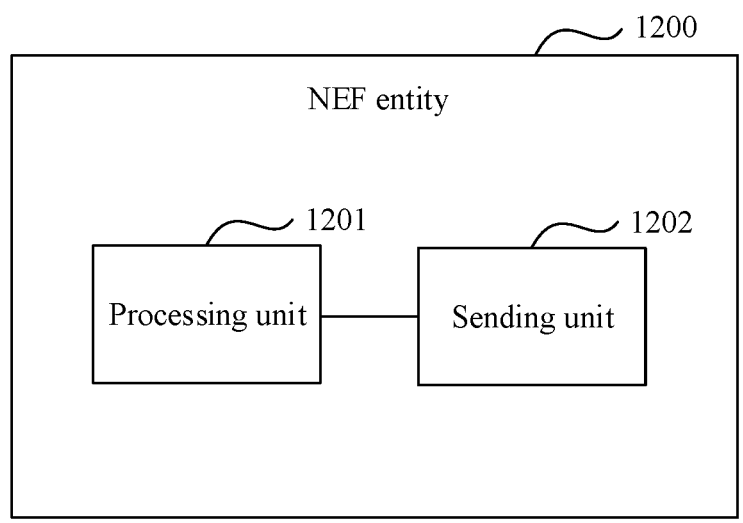
FIG. 12 is a structural diagram of a first NEF entity according to an embodiment of this application.

Based on the foregoing embodiments, this application further provides an NEF entity. The NEF entity may be applied to the communications system shown in FIG. 1, to implement the domain name access method shown in FIG. 7 or FIG. 8A, FIG. 8B, and FIG. 8C. Referring to FIG. 12, the NEF entity 1200 includes a processing unit 1201 and a sending unit 1202.

The processing unit 1201 is configured to determine that Internet Protocol IP address information of an application server corresponding to a domain name changes.

The sending unit 1202 is configured to notify a policy control function PCF entity that the IP address information of the application server corresponding to the domain name changes.

Optionally, the IP address information of the application server is a data network access identifier DNAI of the application server.

This embodiment of this application provides an NEF entity. After determining that the IP address information of the application server corresponding to the domain name changes, the NEF entity instructs, through the PCF entity, the SMF entity to notify, when an IP address allocated by the SMF entity to a terminal device changes, the terminal device to re-perform DNS resolution on the domain name. In this way, the terminal device can obtain a more suitable application server by re-performing the resolution, and further perform data transmission with the application server, to access the domain name. Therefore, in the solution, communication efficiency of the terminal device can be improved, and waste of transmission resources in a communications system is also avoided.

In addition, the processing unit 1201 and the sending unit 1202 in the NEF entity 1200 may further implement another operation or function of the NEF entity in the foregoing method. Details are not described herein again.

Figure 13:
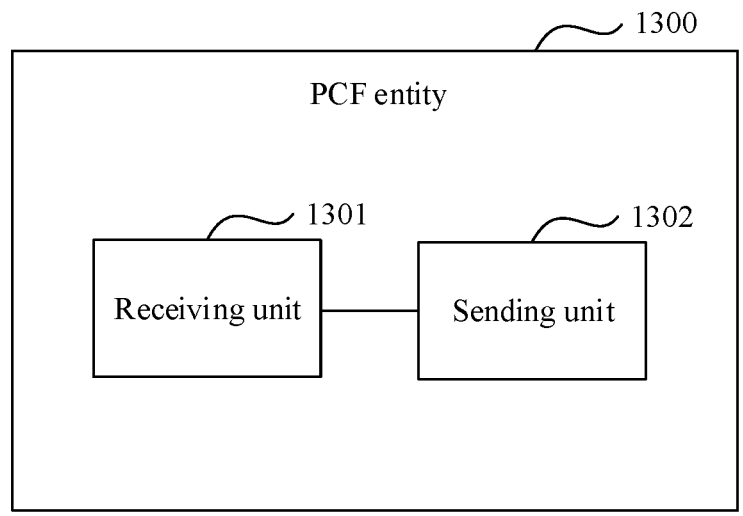
FIG. 13 is a structural diagram of a first PCF entity according to an embodiment of this application.

Based on the foregoing embodiments, this application further provides a PCF entity. The PCF entity may be applied to the communications system shown in FIG. 1, to implement the domain name access method shown in FIG. 7 or FIG. 8A, FIG. 8B, and FIG. 8C. Referring to FIG. 13, the PCF entity 1300 includes a receiving unit 1301 and a sending unit 1302.

The receiving unit 1301 is configured to learn, from a network exposure function NEF entity, that Internet Protocol IP address information of an application server corresponding to a domain name changes.

The sending unit 1302 is configured to send indication information to a session management function SMF entity, where the indication information is used to instruct the SMF entity to notify, when an IP address allocated by the SMF entity to a terminal device changes, the terminal device to perform DNS resolution on the domain name.

This embodiment of this application provides a PCF entity. After learning, from the NEF entity, that the IP address information of the application server corresponding to the domain name changes, the PCF entity instructs the SMF entity to notify, when the IP address allocated by the SMF entity to the terminal device changes, the terminal device to re-perform the DNS resolution on the domain name. In this way, the terminal device can obtain a more suitable application server by re-performing the resolution, and further perform data transmission with the application server, to access the domain name. Therefore, in the solution, communication efficiency of the terminal device can be improved, and waste of transmission resources in a communications system is also avoided.

In addition, the receiving unit 1301 and the sending unit 1302 in the PCF entity 1300 may further implement another operation or function of the PCF entity in the foregoing method. Details are not described herein again.

Figure 14:
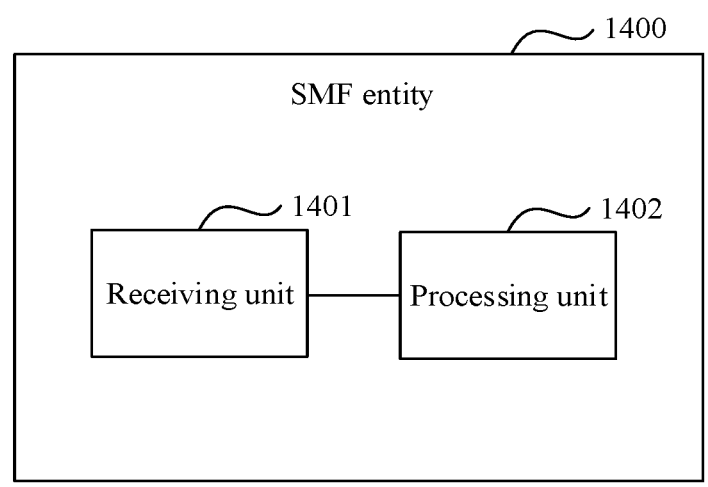
FIG. 14 is a structural diagram of a second SMF entity according to an embodiment of this application.

Based on the foregoing embodiments, this application further provides an SMF entity. The SMF entity may be applied to the communications system shown in FIG. 1, to implement the domain name access method shown in FIG. 7 or FIG. 8A, FIG. 8B, and FIG. 8C. Referring to FIG. 14, the SMF entity 1400 includes a receiving unit 1401 and a processing unit 1402.

The receiving unit 1401 is configured to receive indication information from a policy control function PCF entity.

The processing unit 1402 is configured to notify, based on the indication information when an IP address allocated by the SMF entity to a terminal device changes, the terminal device to perform DNS resolution on the domain name.

This embodiment of this application provides an SMF entity. After determining that the IP address information of the application server corresponding to the domain name changes, the NEF entity instructs, through the PCF entity, the SMF entity to notify, when the IP address allocated by the SMF entity to the terminal device changes, the terminal device to re-perform the DNS resolution on the domain name, so that the SMF entity can notify, when the IP address allocated by the SMF entity to the terminal device changes, the terminal device to perform the DNS resolution on the domain name. In this way, the terminal device can obtain a more suitable application server by re-performing the resolution, and further perform data transmission with the application server, to access the domain name. Therefore, in the solution, communication efficiency of the terminal device can be improved, and waste of transmission resources in a communications system is also avoided.

In addition, the receiving unit 1401 and the processing unit 1402 in the SMF entity 1400 may further implement another operation or function of the SMF entity in the foregoing method. Details are not described herein again.

It should be noted that, division of the modules in the embodiments of this application is only an example, and is merely logical function division. There may be another division manner during an actual implementation. In addition, the functional units in the embodiments of this application may be integrated into one processing unit, or each of the functional units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 15:
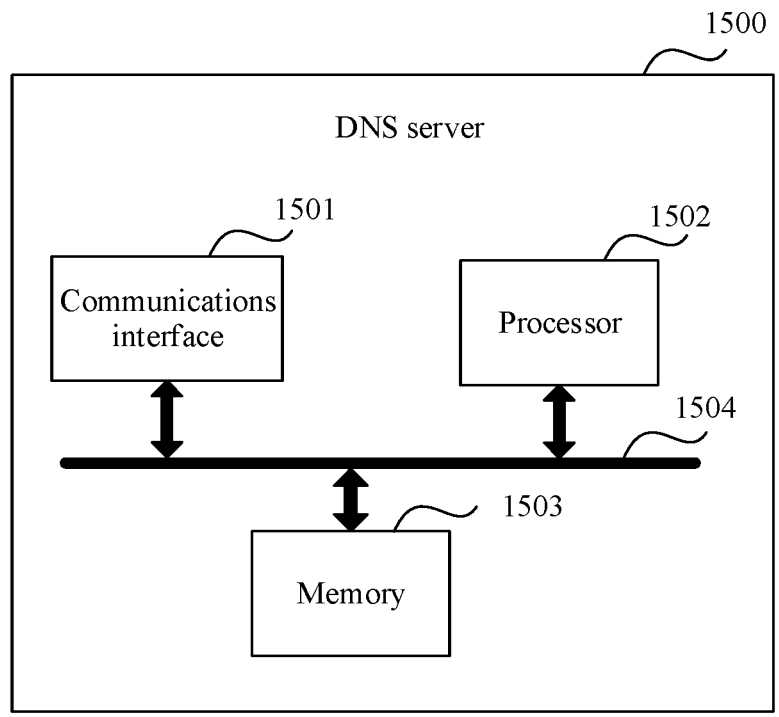
FIG. 15 is a structural diagram of a second DNS server according to an embodiment of this application.

Based on the foregoing embodiments, an embodiment of this application further provides a DNS server. The DNS server may be applied to the communications system shown in FIG. 1, to implement the domain name access method shown in FIG. 3 or FIG. 4A and FIG. 4B, and has the function of the DNS server 900 shown in FIG. 9. Referring to FIG. 15, the DNS server 1500 includes: a communications interface 1501, a processor 1502, and a memory 1503. The communications interface 1501, the processor 1502, and the memory 1503 are mutually connected.

Optionally, the communications interface 1501, the processor 1502, and the memory 1503 are mutually connected by using a bus 1504. The bus 1504 may be a peripheral component interconnect (PCI) bus, an extended industry standard architecture (EISA) bus, or the like. The bus may be classified into an address bus, a data bus, a control bus, or the like. For ease of representation, only one thick line is used to represent the bus in FIG. 15, but this does not mean that there is only one bus or only one type of bus.

The communications interface 1501 is configured to receive and send data, to implement communication with another device in the communications system.

The processor 1502 is configured to implement the domain name access method provided in the embodiments shown in FIG. 3 or FIG. 4A and FIG. 4B. For specific details, refer to the descriptions of the foregoing embodiments. Details are not described herein again.

The memory 1503 is configured to store a program instruction and the like. Specifically, the program instruction may include program code. The program code includes a computer operation instruction. The memory 1503 may include a random access memory (RAM), or may further include a non-volatile memory, for example, at least one magnetic disk memory. The processor 1502 executes the program instruction stored in the memory 1503 to implement the foregoing function, thereby implementing the domain name access method provided in the foregoing embodiments.

Figure 16:
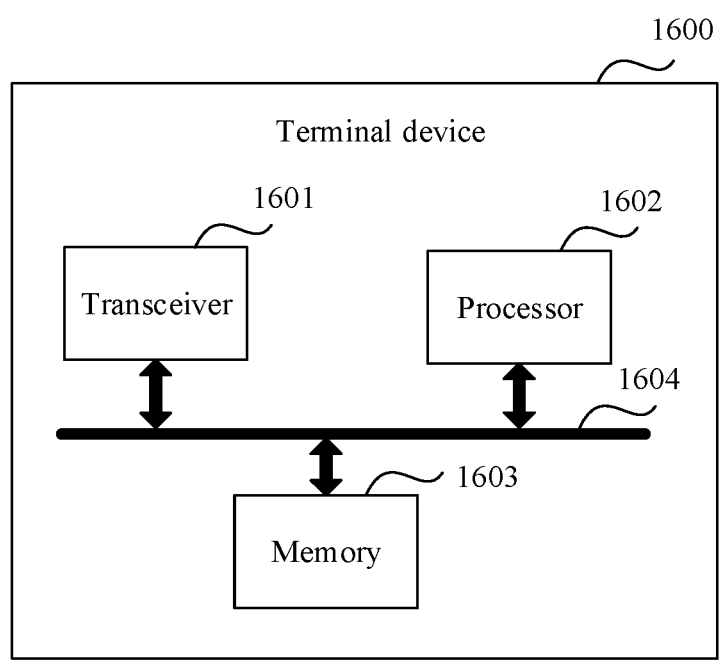
FIG. 16 is a structural diagram of a second terminal device according to an embodiment of this application.

Based on the foregoing embodiments, an embodiment of this application further provides a terminal device. The terminal device may be applied to the communications system shown in FIG. 1, to implement the domain name access method shown in FIG. 3 or FIG. 4A and FIG. 4B, and has the function of the terminal device 1000 shown in FIG. 10. Referring to FIG. 16, the terminal device 1600 includes a transceiver 1601, a processor 1602, and a memory 1603. The transceiver 1601, the processor 1602, and the memory 1603 are mutually connected.

Optionally, the transceiver 1601, the processor 1602, and the memory 1603 are mutually connected by using a bus 1604. The bus 1604 may be a PCI bus, an EISA bus, or the like. The bus may be classified into an address bus, a data bus, a control bus, or the like. For ease of representation, only one thick line is used to represent the bus in FIG. 16, but this does not mean that there is only one bus or only one type of bus.

The transceiver 1601 is configured to receive and send data, to implement communication with another device in the communications system.

The processor 1602 is configured to implement the domain name access method provided in the embodiments shown in FIG. 3 or FIG. 4A and FIG. 4B. For specific details, refer to the descriptions of the foregoing embodiments. Details are not described herein again.

The memory 1603 is configured to store a program instruction and the like. Specifically, the program instruction may include program code. The program code includes a computer operation instruction. The memory 1603 may include a RAM, or may further include a non-volatile memory, for example, at least one magnetic disk memory. The processor 1602 executes the program instruction stored in the memory 1603 to implement the foregoing function, thereby implementing the domain name access method provided in the foregoing embodiments.

Figure 17:
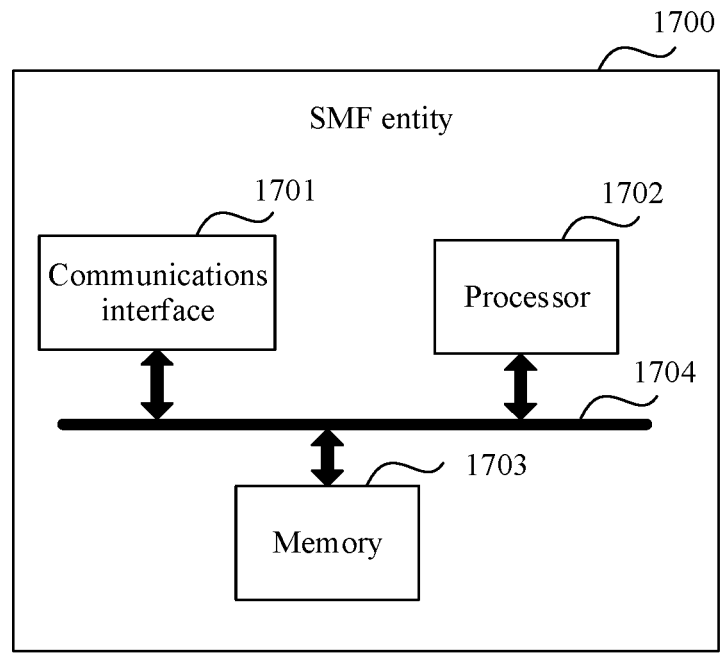
FIG. 17 is a structural diagram of a third SMF entity according to an embodiment of this application.

Based on the foregoing embodiments, an embodiment of this application further provides an SMF entity. The SMF entity may be applied to the communications system shown in FIG. 1, to implement the domain name access method shown in FIG. 5 or FIG. 6A and FIG. 6B, and has the function of the SMF entity 1100 shown in FIG. 11. Referring to FIG. 17, the SMF entity 1700 includes: a communications interface 1701, a processor 1702, and a memory 1703. The communications interface 1701, the processor 1702, and the memory 1703 are mutually connected.

Optionally, the communications interface 1701, the processor 1702, and the memory 1703 are mutually connected by using a bus 1704. The bus 1704 may be a PCI bus, an EISA bus, or the like. The bus may be classified into an address bus, a data bus, a control bus, or the like. For ease of representation, only one thick line is used to represent the bus in FIG. 17, but this does not mean that there is only one bus or only one type of bus.

The communications interface 1701 is configured to receive and send data, to implement communication with another device in the communications system.

The processor 1702 is configured to implement the domain name access method provided in the embodiments shown in FIG. 5 or FIG. 6A and FIG. 6B. For specific details, refer to the descriptions of the foregoing embodiments. Details are not described herein again.

The memory 1703 is configured to store a program instruction and the like. Specifically, the program instruction may include program code. The program code includes a computer operation instruction. The memory 1703 may include a RAM, or may further include a non-volatile memory, for example, at least one magnetic disk memory. The processor 1702 executes the program instruction stored in the memory 1703 to implement the foregoing function, thereby implementing the domain name access method provided in the foregoing embodiments.

Figure 18:
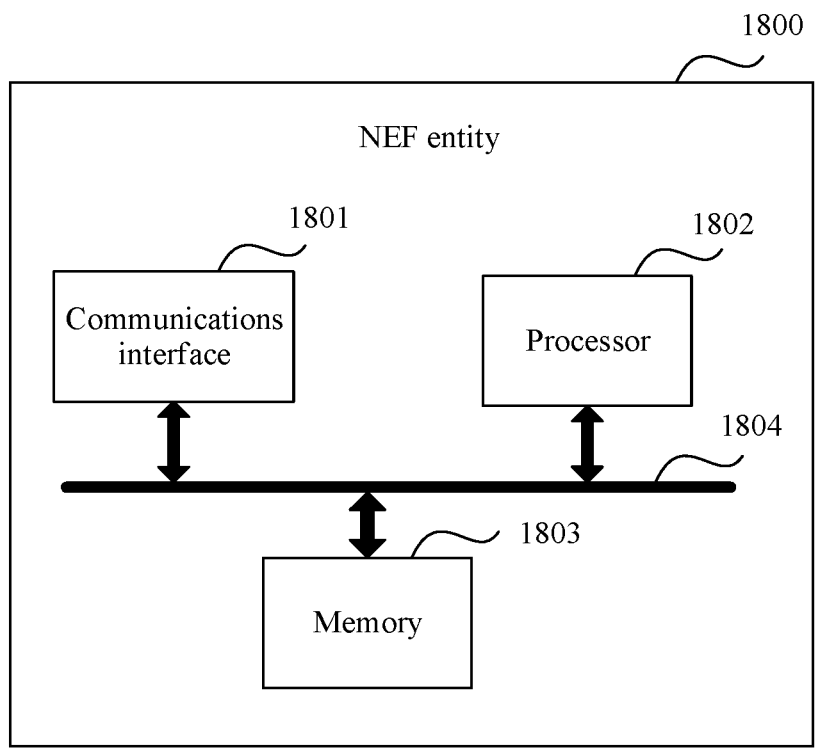
FIG. 18 is a structural diagram of a second NEF entity according to an embodiment of this application.

Based on the foregoing embodiments, an embodiment of this application further provides an NEF entity. The NEF entity may be applied to the communications system shown in FIG. 1, to implement the domain name access method shown in FIG. 7 or FIG. 8A, FIG. 8B, and FIG. 8C, and has the function of the NEF entity 1200 shown in FIG. 12. Referring to FIG. 18, the NEF entity 1800 includes: a communications interface 1801, a processor 1802, and a memory 1803. The communications interface 1801, the processor 1802, and the memory 1803 are mutually connected.

Optionally, the communications interface 1801, the processor 1802, and the memory 1803 are mutually connected by using a bus 1804. The bus 1804 may be a PCI bus, an EISA bus, or the like. The bus may be classified into an address bus, a data bus, a control bus, or the like. For ease of representation, only one thick line is used to represent the bus in FIG. 18, but this does not mean that there is only one bus or only one type of bus.

The communications interface 1801 is configured to receive and send data, to implement communication with another device in the communications system.

The processor 1802 is configured to implement the domain name access method provided in the embodiments shown in FIG. 7 or FIG. 8A, FIG. 8B, and FIG. 8C. For specific details, refer to the descriptions of the foregoing embodiments. Details are not described herein again.

The memory 1803 is configured to store a program instruction and the like. Specifically, the program instruction may include program code. The program code includes a computer operation instruction. The memory 1803 may include a RAM, or may further include a non-volatile memory, for example, at least one magnetic disk memory. The processor 1802 executes the program instruction stored in the memory 1803 to implement the foregoing function, thereby implementing the domain name access method provided in the foregoing embodiments.

Figure 19:
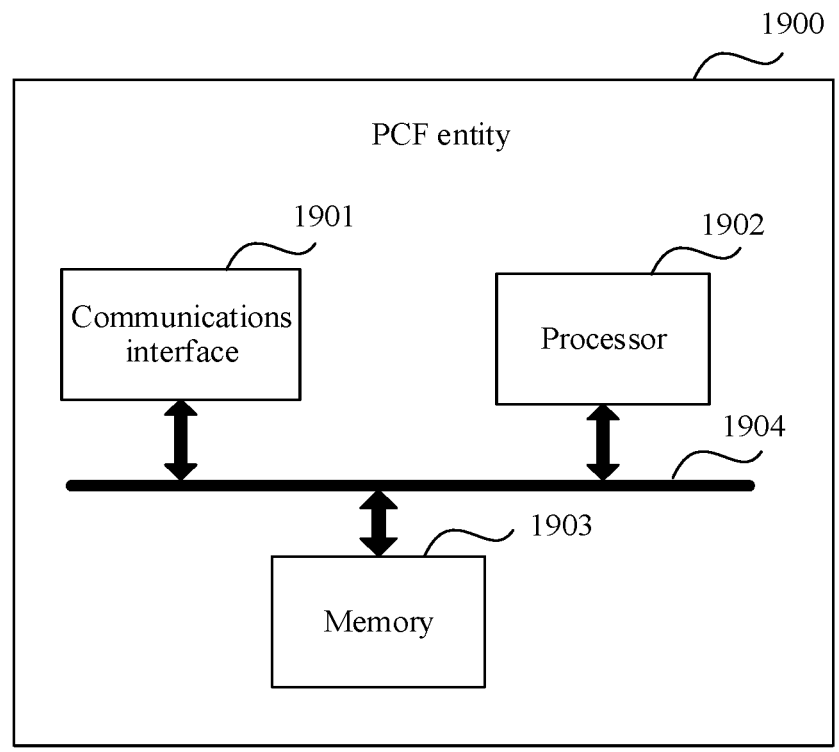
FIG. 19 is a structural diagram of a second PCF entity according to an embodiment of this application.

Based on the foregoing embodiments, an embodiment of this application further provides a PCF entity. The PCF entity may be applied to the communications system shown in FIG. 1, to implement the domain name access method shown in FIG. 7 or FIG. 8A, FIG. 8B, and FIG. 8C, and has the function of the PCF entity 1300 shown in FIG. 13. Referring to FIG. 19, the PCF entity 1900 includes: a communications interface 1901, a processor 1902, and a memory 1903. The communications interface 1901, the processor 1902, and the memory 1903 are mutually connected.

Optionally, the communications interface 1901, the processor 1902, and the memory 1903 are mutually connected by using a bus 1904. The bus 1904 may be a PCI bus, an EISA bus, or the like. The bus may be classified into an address bus, a data bus, a control bus, or the like. For ease of representation, only one thick line is used to represent the bus in FIG. 19, but this does not mean that there is only one bus or only one type of bus.

The communications interface 1901 is configured to receive and send data, to implement communication with another device in the communications system.

The processor 1902 is configured to implement the domain name access method provided in the embodiments shown in FIG. 7 or FIG. 8A, FIG. 8B, and FIG. 8C. For specific details, refer to the descriptions of the foregoing embodiments. Details are not described herein again.

The memory 1903 is configured to store a program instruction and the like. Specifically, the program instruction may include program code. The program code includes a computer operation instruction. The memory 1903 may include a RAM, or may further include a non-volatile memory, for example, at least one magnetic disk memory. The processor 1902 executes the program instruction stored in the memory 1903 to implement the foregoing function, thereby implementing the domain name access method provided in the foregoing embodiments.

Figure 20:
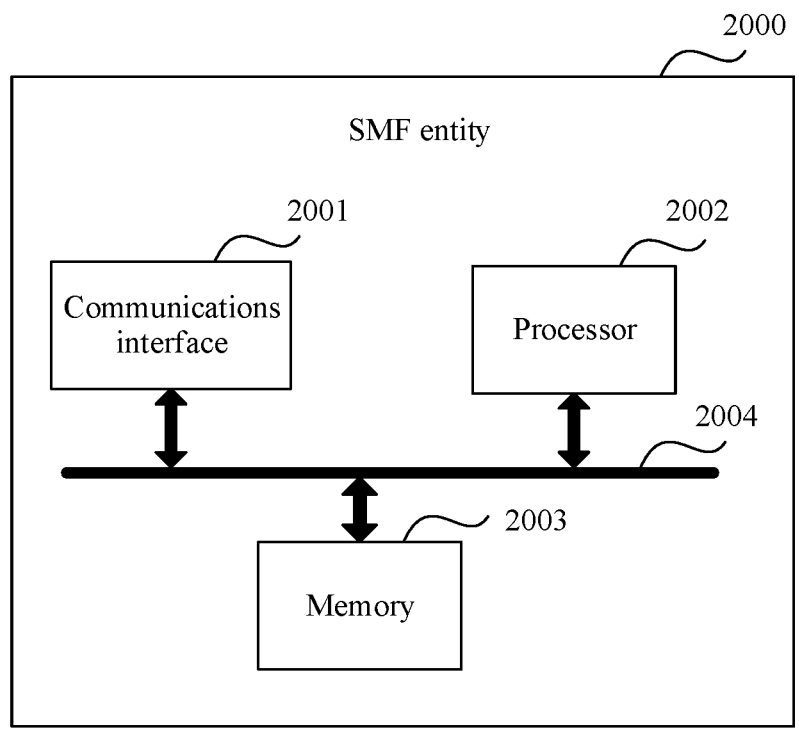
FIG. 20 is a structural diagram of a fourth SMF entity according to an embodiment of this application.

Based on the foregoing embodiments, an embodiment of this application further provides an SMF entity. The SMF entity may be applied to the communications system shown in FIG. 1, to implement the domain name access method shown in FIG. 7 or FIG. 8A, FIG. 8B, and FIG. 8C, and has the function of the SMF entity 1400 shown in FIG. 14. Referring to FIG. 20, the SMF entity 2000 includes: a communications interface 2001, a processor 2002, and a memory 2003. The communications interface 2001, the processor 2002, and the memory 2003 are mutually connected.

Optionally, the communications interface 2001, the processor 2002, and the memory 2003 are mutually connected by using a bus 2004. The bus 2004 may be a PCI bus, an EISA bus, or the like. The bus may be classified into an address bus, a data bus, a control bus, or the like. For ease of representation, only one thick line is used to represent the bus in FIG. 20, but this does not mean that there is only one bus or only one type of bus.

The communications interface 2001 is configured to receive and send data, to implement communication with another device in the communications system.

The processor 2002 is configured to implement the domain name access method provided in the embodiments shown in FIG. 7 or FIG. 8A, FIG. 8B, and FIG. 8C. For specific details, refer to the descriptions of the foregoing embodiments. Details are not described herein again.

The memory 2003 is configured to store a program instruction and the like. Specifically, the program instruction may include program code. The program code includes a computer operation instruction. The memory 2003 may include a RAM, or may further include a non-volatile memory, for example, at least one magnetic disk memory. The processor 2002 executes the program instruction stored in the memory 2003 to implement the foregoing function, thereby implementing the domain name access method provided in the foregoing embodiments.

Based on the above, this application provides a domain name access method and a device. In the solution, a DNS server performs resolution on a domain name requested by a terminal device, and then sends, to the terminal device, use condition information and an IP address of an application server corresponding to the domain name obtained through the resolution. The use condition information indicates a condition that should be satisfied when the terminal device can access the domain name by using the IP address of the application server. In this way, the terminal device can perform, based on the received IP address of the application server, data transmission with the application server, and when information of the terminal device changes due to movement of the terminal device, and the terminal device no longer satisfies the condition indicated by the use condition information, the terminal device can re-perform DNS resolution on the domain name. When the information of the terminal device changes and the terminal device no longer satisfies the condition indicated by the use condition information, the application server previously obtained through the resolution may no longer be the application server that is most suitable for the terminal device. In this case, according to the solution, the terminal device may obtain another suitable application server by re-performing the DNS resolution on the domain name. Therefore, in the solution, communication efficiency of the terminal device can be improved, and waste of transmission resources in a communications system is also avoided.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of the another programmable data processing device generate an apparatus for implementing a specific function in one or more procedures in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Obviously, a person skilled in the art can make various modifications and variations to this application without departing from the spirit and scope of this application. In this way, this application is intended to cover these modifications and variations of this application provided that they fall within the scope of protection defined by claims of this application and equivalent technologies thereof.

What is claimed is:

1. A domain name access method, comprising:
sending, by a terminal device, a request message to a domain name system (DNS) server, wherein the request message comprises a domain name requested by the terminal device;
receiving, by the terminal device, a response message from the DNS server, wherein the response message comprises an Internet Protocol (IP) address of an application server and use condition information, the application server corresponds to the domain name, and the use condition information indicates a condition in which the terminal device is only allowed to access the domain name by using the IP address of the application server when the terminal device satisfies the condition indicated by the use condition information, and wherein the use condition information comprises location range information that indicates a location range in which the terminal device is located; and performing, by the terminal device, DNS resolution on the domain name when the terminal device does not satisfy the condition indicated by the use condition information.

2. The method according to claim 1, wherein the method further comprises:

receiving, by the terminal device, indication information from the DNS server, wherein the indication information instructs the terminal device to perform the DNS resolution on the domain name when the terminal device does not satisfy the condition indicated by the use condition information; and determining, by the terminal device based on the indication information, whether the terminal device satisfies the condition indicated by the use condition information.

3. The method according to claim 2, wherein the method further comprises:

temporarily storing, by the terminal device, a DNS caching record, wherein the DNS caching record comprises the domain name, the use condition information, and the IP address of the application server.

4. The method according to claim 3, wherein the DNS caching record further comprises time to live (TTL) of the DNS caching record; and determining, by the terminal device, that the terminal device does not satisfy the condition indicated by the use condition information comprises:

determining, by the terminal device, that the terminal device does not satisfy, within the TTL, the condition indicated by the use condition information.

5. The method according to claim 1, wherein when the use condition information comprises the location range information, that the terminal device does not satisfy the condition indicated by the use condition information comprises: a location of the terminal device changes and the changed location of the terminal device is not within the location range indicated by the location range information.

6. A terminal device, comprising:

a transmitter configured to send a request message to a domain name system (DNS) server, wherein the request message comprises a domain name requested by the terminal device;

a receiver configured to receive a response message from the DNS server, wherein the response message comprises an Internet Protocol (IP) address of an application server and use condition information, the application server corresponds to the domain name, and the use condition information indicates a condition in which the terminal device is only allowed to access the domain name by using the IP address of the application server when the terminal device satisfies the condition indicated by the use condition information, and wherein the use condition information comprises location range information that indicates a location range in which the terminal device is located; and a processor, coupled with a memory storing at least one instruction, the processor configured to execute the at least one instruction to perform DNS resolution on the domain name when the terminal device does not satisfy the condition indicated by the use condition information.

7. The terminal device according to claim 6, wherein when the use condition information comprises location range information, that the terminal device does not satisfy the condition indicated by the use condition information comprises: a location of the terminal device changes and the changed location of the terminal device is not within the location range indicated by the location range information.

8. The terminal device according to claim 6, wherein the processor is further configured to execute the at least one instruction to:

temporarily store a DNS caching record after the receiver receives the response message from the DNS server, wherein the DNS caching record comprises the domain name, the use condition information, and the IP address of the application server.

9. The terminal device according to claim 8, wherein the DNS caching record further comprises time to live (TTL) of the DNS caching record; and to determine that the terminal device does not satisfy the condition indicated by the use condition information, the processor is configured to execute the at least one instruction to:

determine that the terminal device does not satisfy, within the TTL, the condition indicated by the use condition information.

10. The terminal device according to claim 6, wherein the receiver is further configured to receive indication information from the DNS server, wherein the indication information instructs the terminal device to perform the DNS resolution on the domain name when the terminal device does not satisfy the condition indicated by the use condition information; and the processor is further configured to execute the at least one instruction to determine, based on the indication information, whether the terminal device satisfies the condition indicated by the use condition information.

11. A domain name system (DNS) server, comprising:

a receiver configured to receive a request message from a terminal device, wherein the request message comprises a domain name requested by the terminal device;

a processor, coupled with a memory storing at least one instruction, the processor configured to execute the at least one instruction to perform resolution on the domain name, to obtain an Internet Protocol (IP) address of an application server corresponding to the domain name; and a transmitter configured to send a response message to the terminal device, wherein the response message comprises the IP address of the application server and use condition information, and the use condition information indicates a condition in which the terminal device is only allowed to access the domain name by using the IP address of the application server when the terminal device satisfies the condition indicated by the use condition information, and wherein the use condition information comprises location range information that indicates a location range in which the terminal device is located.

12. The DNS server according to claim 11, wherein the processor is further configured to execute the at least one instruction to:

determine the use condition information based on the request message.

13. The DNS server according to claim 12, wherein the request message further comprises location information of the terminal device; and to determine the use condition information based on the request message, the processor is configured to execute the at least one instruction to:

determine the use condition information based on the location information of the terminal device comprised in the request message.

14. The DNS server according to claim 12, wherein the request message further comprises an IP address of the terminal device; and to determine the use condition information based on the request message, the processor is configured to execute the at least one instruction to:

determine the use condition information based at least in part on the IP address of the terminal device comprised in the request message.

15. The DNS server according to claim 11, wherein the transmitter is further configured to send indication information to the terminal device, wherein the indication information instructs the terminal device to perform DNS resolution on the domain name when the terminal device does not satisfy the condition indicated by the use condition information.

\* \* \* \* \*